United States Patent [19]
Tsou et al.

[11] Patent Number: 5,508,706
[45] Date of Patent: Apr. 16, 1996

[54] RADAR SIGNAL PROCESSOR

[75] Inventors: Hsi-Shen E. Tsou, Rancho Palos Verdes; Mark T. Core, Placentia; James G. Harrison, Cypress; Philip J. Moffa, Torrance; Gregory A. Shreve, Redondo Beach, all of Calif.

[73] Assignee: TRW Inc., Redondo Beach, Calif.

[21] Appl. No.: 173,540

[22] Filed: Dec. 23, 1993

Related U.S. Application Data

[63] Continuation-in-part of Ser. No. 117,266, Sep. 7, 1993, which is a continuation-in-part of Ser. No. 767,953, Sep. 30, 1991, Pat. No. 5,315,303.

[51] Int. Cl.⁶ ............................................. G01S 13/532
[52] U.S. Cl. ................................. 342/192; 342/110
[58] Field of Search ............................... 342/109, 110, 342/114, 115, 128, 175, 192, 196; 364/724.01

[56] References Cited

U.S. PATENT DOCUMENTS 5,134,411 7/1992 Adler .................................. 342/128
5,270,720 12/1993 Stove .................................. 342/114
5,373,460 12/1994 Marks, II ....................... 364/724.01

*Primary Examiner*—Daniel T. Pihulic

[57] ABSTRACT

A radar system includes a radar transceiver for generating transmit signals and for receiving signals reflected by targets. The radar system includes a mixer for combining the transmit signals and the reflected signals into a mixer signal. A radar signal processor includes a sampling device, connected to the mixer, for sampling the mixer signal and for generating a sampled mixer signal. A spectrum estimation device, connected to the sampling device, generates a range profile signal including a plurality of range bins each containing a magnitude of a spectral component. A threshold device, connected to the spectrum estimation device, generates a target space array from the range profile signal. A target decision device, connected to the threshold device, generates estimated range and speed signals for a closest target from the target space array.

24 Claims, 18 Drawing Sheets

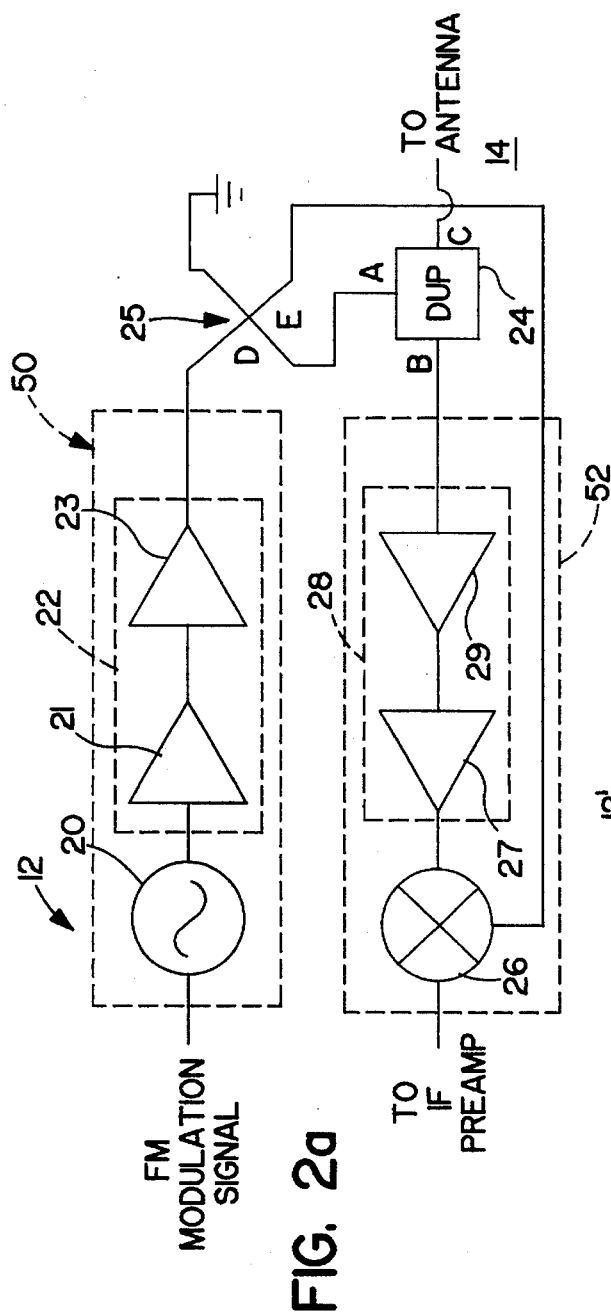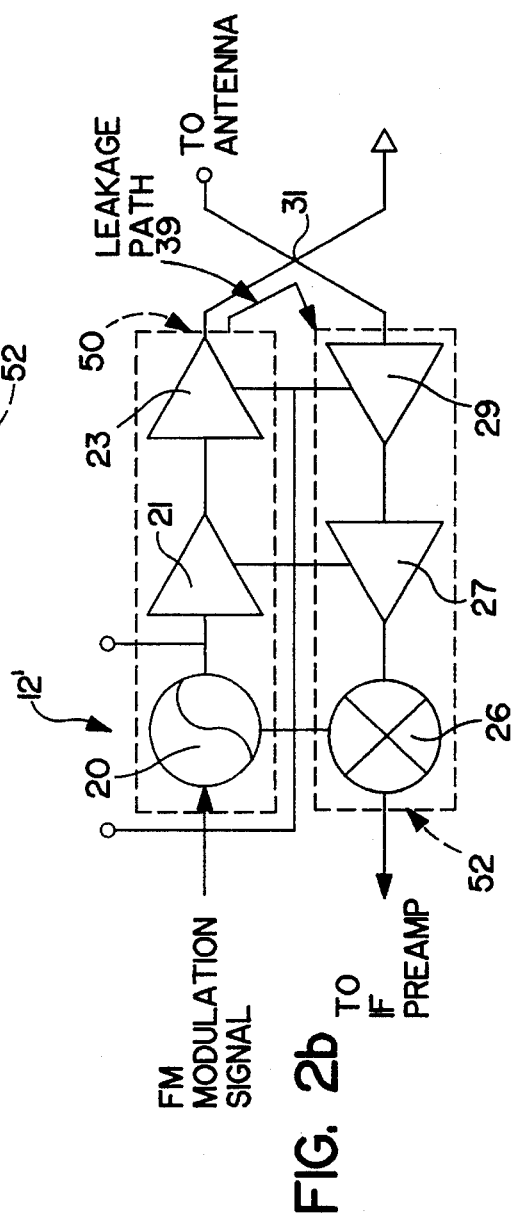
FIG. 2a
FIG. 2b

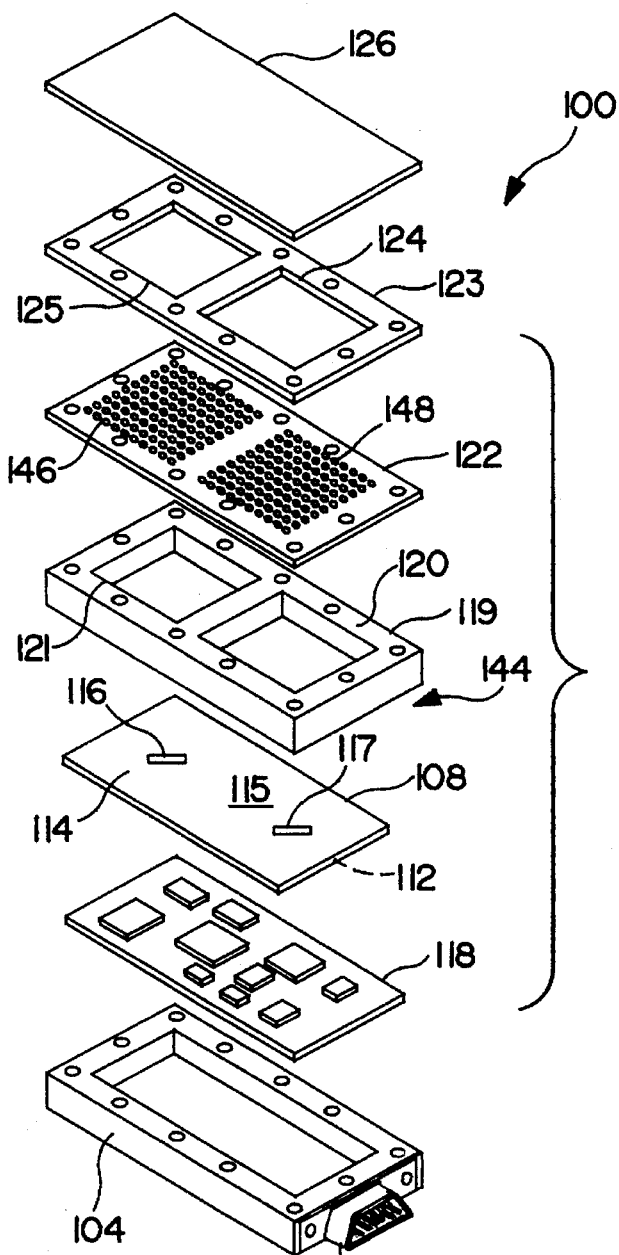
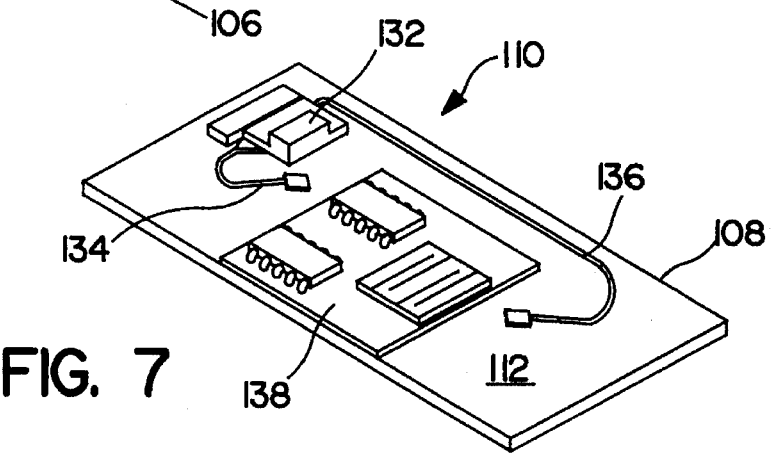
FIG. 6
FIG. 7

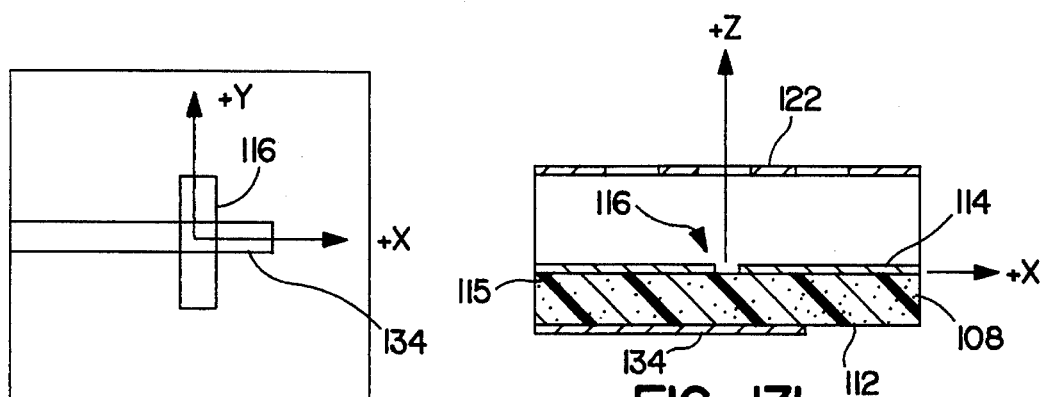
FIG. 13a
FIG. 13b
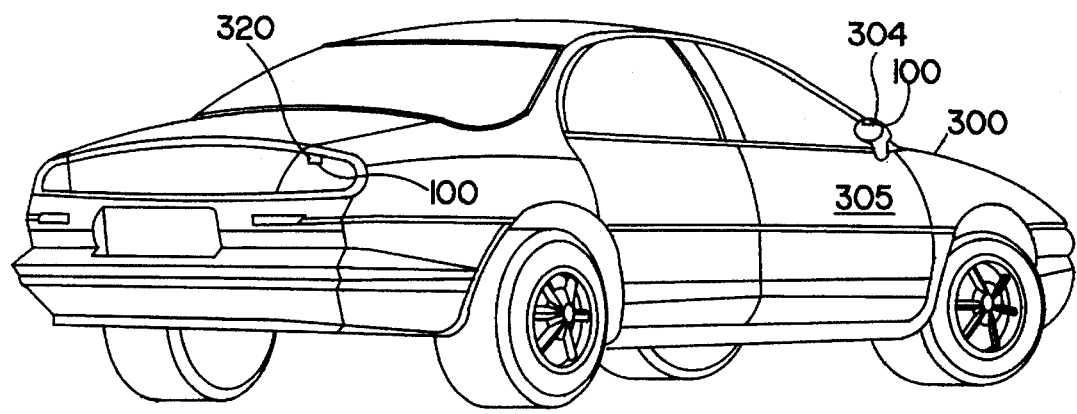
FIG. 14a
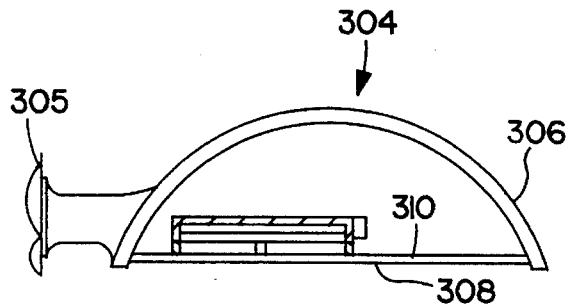
FIG. 14b
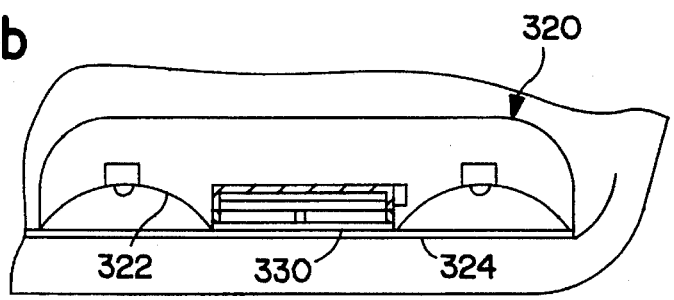
FIG. 14c

RADAR SIGNAL PROCESSOR

CROSS-REFERENCE TO RELATED APPLICATIONS

This application is a continuation-in-part of U.S. patent application Ser. No. 08/117,266 filed Sep. 7, 1993, which is a continuation-in-part of U.S. patent application Ser. No. 07/767,953 filed Sep. 30, 1991, now U.S. Pat. No. 5,315, 303.

BACKGROUND OF THE INVENTION

1. Technical Field

This invention relates to radar systems and, more particularly, to a radar signal processor for a radar system.

2. Discussion

Radar sensors are generally employed for detecting objects within a desired field. Typical sensing systems have been developed which employ radar, laser, infrared (IR), or ultrasonic principles. However, each of these systems has its drawbacks. Current radar sensors operate at frequencies which are too low to incorporate the advanced monolithic millimeter wave integrated circuit (MMIC) and compact patch antenna technology. Generally, these sensing units are bulky and difficult to integrate into a host system. In addition, current radar sensing units require a large number of components which make the units costly. As a result, these systems are limited in modularity and flexibility, and therefore, applications. Typical laser sensors generally suffer from high cost, in addition to potential health hazards. Furthermore, they are limited by environmental conditions such as fog and smoke. Infrared and ultrasonic sensors have limitations which include sensitivity to environmental interferences, as well as interference from other similar sources, in addition to noise.

There is a need for an effective compact, flexible and integrated radar sensor that can be easily integrated into many systems for various applications. In particular, there exists a need for a compact, low cost, flexible radar sensor for automotive and space and defense-related applications and the like. Such applications may include integrating such a radar sensor onto an automotive vehicle to provide a blind spot detector for crash avoidance purposes. For advanced vehicle designs, such as those involving four-wheel drive functions, there is a need for a smart sensor to determine the true ground speed of the vehicle for cruise control purposes, accurate vehicle speed measurement, and four-wheel steering. In addition, there exists a need for a smart sensor to determine the vehicle height and to project the road surface ahead for advanced adaptive suspension systems. Furthermore, for military applications, there exists a need for a compact, modular, low cost sensor for collision avoidance on armored vehicles, heavy robotic equipment and all types of transportation equipment during night operations and under adverse conditions such as fog and battle field smoke.

Sensor systems have been developed and provided for such applications. Typical systems have generally employed radar, laser, infrared, and ultrasonic sensors. However, these systems have not been widely deployed because of high cost, poor performance, excessive size, and limited flexibility.

It is therefore desirable to obtain an effective, low cost, compact and safe to operate radar sensor. It is further desirable to obtain such a radar sensor which can be easily integrated into various systems. Such a system may include an automotive vehicle for providing a blind spot detector, a true ground speed measuring device, a vehicle height measurement device, and other various applications.

Conventional methods for constructing a radar sensor use electronics and an antenna which are separate components. The electronics are typically packaged inside a sealed conductive box for environmental protection and electromagnetic shielding. The electronics and the antenna are then assembled. Another conventional method packages the electronics inside a horn antenna. Still another approach utilizes feed assemblies in combination with reflector or lens antenna systems. Such designs are bulky and expensive.

Therefore, a radar system which integrates the electronics and the antenna system into a compactly packaged radar system is desirable.

Conventional digital radar signal processors are typically bulky, are unable to provide reasonable target reporting response times, and/or are too costly to allow use in vehicle radar systems. Other conventional vehicle radar signal processors have been unable to operate in environments with noisy signals and with high clutter, for example clutter caused by roadsigns, guardrails, etc.

Conventional, cost effective vehicle radar signal processors have also encountered significant problems tracking a vehicle which has variable velocity, acceleration and range, and tracking a single vehicle when other vehicles are present.

Conventional vehicle radar signal processors typically include relatively costly and complex processors to perform complex mathematical routines such as variable-point arithmetic and/or perform many operations using division. Division is relatively time consuming to perform using a microprocessor as compared with other operations.

Therefore, an improved radar signal processor addressing the above shortfalls of conventional radar signal processors is desirable.

SUMMARY OF THE INVENTION

A radar system includes a radar transceiver for generating transmit signals and for receiving signals reflected by targets. The radar system includes a mixer for combining the transmit signals and the reflected signals into a mixer signal. A radar signal processor includes a sampling device, connected to the mixer, for sampling the mixer signal and for generating a sampled mixer signal. A spectrum estimation device, connected to the sampling device, generates a range profile signal including a plurality of range bins each containing a magnitude of a spectral component. A threshold device, connected to the spectrum estimation device, generates a target space array from the range profile signal. A target decision device, connected to the threshold device, generates estimated range and speed signals for a closest target from the target space array.

In a further feature of the invention, the spectrum estimation device includes a time window device, connected to the sampling device, for generating a windowed signal by multiplying the sampled mixer signal with a time window function to reduce spectral leakage. The time window function can be a raised cosine function. The spectrum estimation device can further include a generating device, connected to the time window device, for generating a frequency spectrum signal including a series of spectral components. The generating device can use a fast fourier transform to generate the frequency spectrum signal.

In a further feature of the invention, the spectrum estimation device can further include a magnitude device, connected to the generating device, for generating a magnitude range profile signal including a plurality of range bins each containing magnitudes of the spectral components. The spectrum estimation device can further include an equalization device, connected to the magnitude device, for generating an equalized range profile signal including a plurality of range bins having a noise floor substantially constant with respect to frequency.

In still a further feature of the invention, the spectrum estimation device can further include an averaging device connected to the equalization device, for integrating the equalized range profile signal with at least one prior range profile signal to generate an integrated range profile signal and to increase signal to noise ratio thereof.

In still another feature of the invention, the threshold device generates a threshold range profile signal including a plurality of range bins and includes a comparing device for comparing the range bins of the threshold range profile signal with range bins of the integrated range profile signal. The threshold device generates target flags for range bins of the range profile signal having a magnitude above a corresponding range bin of the threshold range profile signal. The magnitude of the range bins of the threshold range profile signal are related to the magnitude of a plurality of adjacent range bins of the range profile signal. The threshold device can further include an averaging device with a moving window for averaging magnitudes of a plurality of adjacent range bins in the range profile signal. A multiplying device can multiply the average by a threshold constant to generate a detection threshold value for one range bin in the threshold range profile signal. An incrementing device increments the moving window. The control means repeatedly actuates the averaging device, the multiplying device, and the incrementing device to generate detection threshold values for each range bin of the threshold range profile signal.

The threshold device can further include a centroiding device for combining target flags in adjacent range bins and for generating a single target flag in a range bin central to the adjacent range bins.

And still another feature of the invention, the target decision device includes first estimation means for executing an acquisition mode by performing a Hough transform to derive target range and speed for at least one target using the target space array.

And still another feature of the invention, the target decision device includes a second estimation means for executing a tracking mode by performing a Hough transform to derive target range, speed and acceleration for at least one target using the target space array.

Other objects, features and advantages will be readily apparent.

BRIEF DESCRIPTION OF THE DRAWINGS

The various advantages of the present invention will become apparent to those skilled in the art by reading the following specification and by reference to the following drawings in which:

FIG. 2a is a block diagram which illustrates a monolithic millimeter wave integrated circuit (MMIC) transceiver;

FIG. 2b is a block diagram which illustrates an alternate embodiment of a monolithic millimeter wave integrated circuit (MMIC) transceiver;

FIG. 6 is an assembly view of a compact packaging system for a radar system according to the present invention;

FIG. 7 is a view of a radar circuit fabricated on a bottom surface of a dielectric substrate;

FIG. 10b is a side view of the slot radiator of FIG. 10a;

FIG. 11b is a side view of the slot radiator with the reflector ground plane of FIG. 11a;

FIG. 12b is a side view of the slot-coupled patch radiator of FIG. 12a;

FIG. 13a is a top view of a slot-coupled radiator incorporating a frequency selective surface according to the present invention;

FIG. 13b is a side view of the slot-coupled radiator incorporating a frequency selective surface of FIG. 13a;

FIG. 14a is a perspective view of a vehicle incorporating the radar system of FIG. 6 in a side view mirror and tail light assembly;

FIG. 14b is a top view of the side view mirror of FIG. 14a;

FIG. 14c is a top view of the tail light assemble of FIG. 14a;

DETAILED DESCRIPTION OF THE PREFERRED EMBODIMENT

Figure 1:
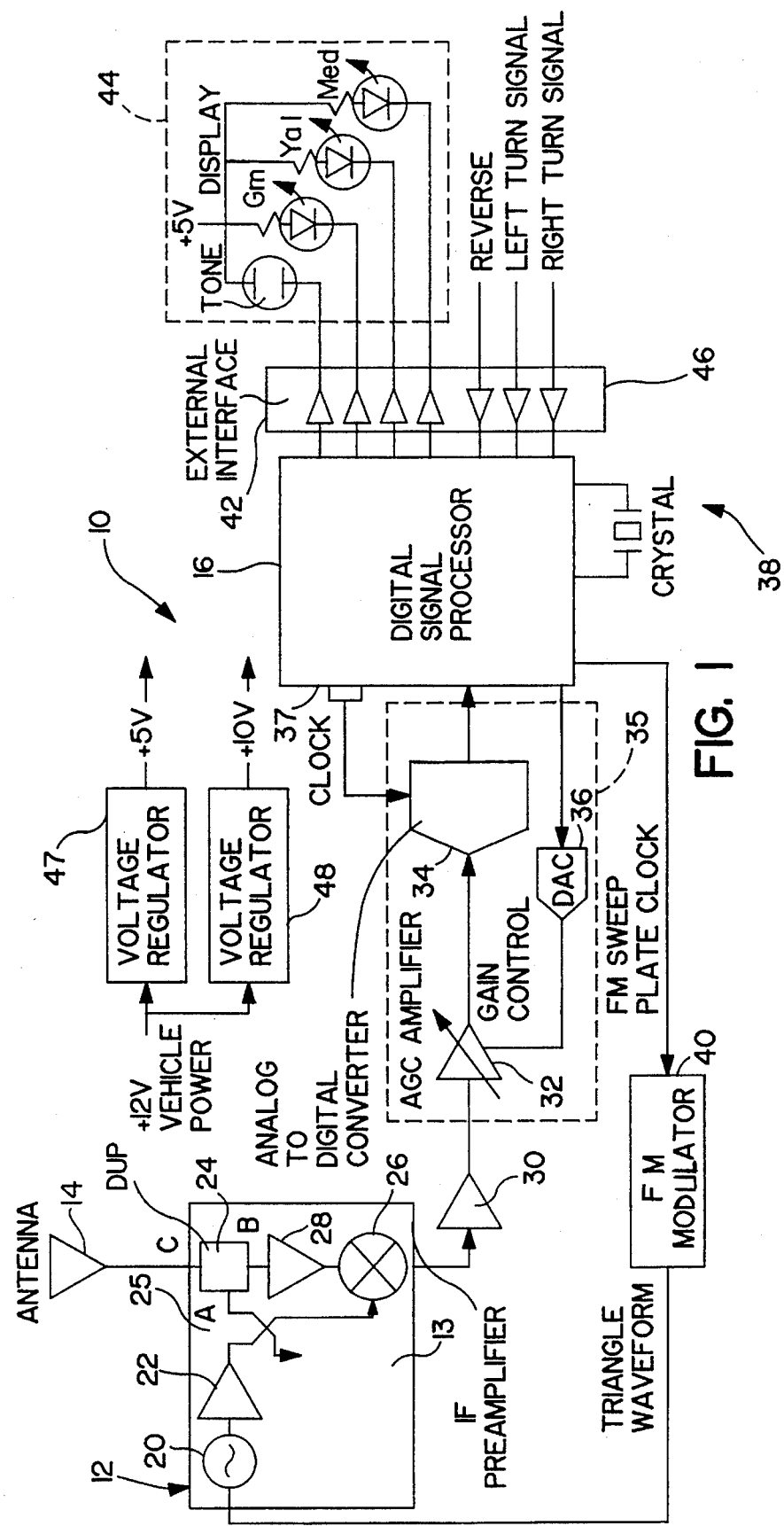
FIG. 1 is a schematic block diagram which illustrates a compact millimeter wave radar sensor in accordance with the present invention.

Turning now to FIG. 1, a schematic block diagram is shown therein which illustrates a compact millimeter wave (MMW) radar sensor 10 in accordance with the present invention. Radar sensor 10 employs a monolithic millimeter wave integrated circuit (MMIC) transceiver 12. The transceiver 12 provides MMW transmit and receive functions which are integrated onto a single monolithic chip 13 using standard photolithographic techniques known in the art. Transceiver 12 includes a voltage controlled oscillator (VCO) 20 which is connected to an amplifier 22. Amplifier 22 is further connected to a coupler 25 which is connected to port A of duplexer 24. A pre-amplifier 28 is connected to port B of duplexer 24 for amplifying a reflected signal received by antenna 14. A balanced mixer 26 is provided which has an input connected to the output of pre-amplifier 28. Balanced mixer 26 is further adapted to receive a leakage signal which is the result of the coupler 25 output of the transmitted signal generated by the voltage controlled oscillator 20 and the transmit amplifier 22. Balanced mixer 26 is adapted to provide the difference between the transmit signal and the reflected signal. The output of balanced mixer 26 is an intermediate frequency (IF) known as the beat frequency which contains the range information. In an alternate embodiment, duplexer 24 and coupler 25 may be removed and replaced with a simple coupler to allow for further cost savings and smaller size.

An antenna 14 is connected to port C of duplexer 24. The antenna 14 can be a microstrip patch antenna. Other antenna configurations will be readily apparent to those skilled in the art. The antenna 14 is adapted to transmit a high frequency modulated carrier signal throughout a desired field to be monitored. This transmitted signal may have a frequency of around 35 to 94 GHz. Higher frequency signal may also be employed. Antenna 14 is further adapted to receive a reflected signal Which is the result of the transmitted signal reflecting off of objects located within the field.

An IF pre-amplifier 30 is connected to the output of the balanced mixer 26 for amplifying the IF output signal therefrom. Connected to the output of IF pre-amplifier 30 is an automatic gain control amplifier 32 which provides high dynamic range. An analog-to-digital converter 34 is connected to the output of the automatic gain control amplifier 32 for receiving a signal therefrom. The analog-to-digital converter 34 is further adapted to receive a clock signal from clock 37 of digital signal processor 16 and provide a digital output to the digital signal processor 16. Analog-to-digital converter 34 is a standard off-the-shelf 8-bit converter and is capable of handling IF signals and providing a dynamic range of about 48 Db. A digital-to-analog converter 36 is further connected to digital signal processor 16 for receiving an input signal therefrom. The digital-to-analog converter 36 is adapted to provide a gain control signal to the automatic gain control amplifier 32 which provides a dynamic range of about 50 dB. The automatic gain control amplifier 32 in combination with the analog-to-digital converter 34, the digital signal processor 16, and the digital-to-analog converter 36 make up a dynamic range adjustment control loop 35. Control loop 35 provides for the dynamic range required to process the variations in target reflections and the range of distance desired.

An FM modulator 40 is connected to digital signal processor 16 for receiving a square wave signal therefrom. FM modulator 40 is configured for providing a triangular modulation waveform signal at the same periodicity as the square waveform. The output of FM modulator 40 is connected to the input of the voltage controlled oscillator 20 of transceiver 12 for providing the frequency modulated signal thereto.

Digital signal processor 16 is further connected to an external interface 42. External interface 42 provides connection to an output display 44 and input terminals 46. Digital signal processor 16 is manufactured by AT&T and has a model number DSP 16. Other suitable digital signal processors such as a Motorola 56001 and Texas Instruments TMS320C15 may also be used. Digital signal processor 16 performs all the necessary processing and embedded intelligence functions therein. Processor 16 includes processing capabilities for providing digital filtering, integrations and various other processing functions. In essence, digital signal processor 16 is adapted to provide control signals and detect any reflected signal from objects within the field being monitored and provide output responses therefrom. From the frequency shift and other information, the digital signal processor 16 provides the distance information.

A compact voltage regulator 47 provides the +5 v DC supply from a 12 v DC supply. Another compact voltage regulator 48 provides the +10 v DC supply from the 12 v DC supply. In a different embodiment, different voltage regulators may be used to provide the +5 v and +10 v DC from other voltage sources.

FIG. 2a is a block diagram which illustrates one embodiment of the monolithic millimeter wave integrated circuit (MMIC) transceiver 12. Transceiver 12 includes a voltage-controlled oscillator (VCO) 20 adapted to receive the FM modulation signal from FM modulator 40 and provide a frequency modulated carrier signal therefrom. Voltage controlled oscillator 20 includes a single high electron mobility transistor (HEMT) and an associated tank circuit for providing the carrier signal. The voltage controlled oscillator 20 is modulated by applying a voltage to a varactor located in an oscillator tank circuit. Connected to the output of the voltage controlled oscillator 20 is a two-stage amplifier 22 having a first amplifier stage 21 and second amplifier stage 23. Amplifier 22 amplifies the signal which is then transmitted to the antenna 14 through the duplexer 24 and the coupler 25. The output of amplifier 22 is connected to port D of the coupler 25. The port E of the coupler 25 is connected to the port A of the duplexer 24. The transmit output to the antenna 14 is through port C of the duplexer 24. The combination of voltage controlled oscillator 20 in connection with the amplifier 22 forms a transmitter 50.

Transceiver 12 further includes a two-stage pre-amplifier 28 having a first stage 29 and second stage 27. Pre-amplifier 28 is adapted to receive and amplify the reflected signals gathered by the antenna 14. The balanced mixer 26 is connected to the output of the pre-amplifier 28. Together, balanced mixer 26 and the pre-amplifier 28 form the receiver 52. The duplexer 24 and the coupler 25 form a network for isolating the transmitter 50 from the receiver 52. The coupler provides the reference transmit signal path to the balanced mixer 26 of the receiver 52 and the transmit path to the duplexer 24 and antenna 14. The balanced mixer 26 provides the difference between the reference signal and the reflected signal to obtain an intermediate frequency (IF) known as the beat frequency. The resulting beat frequency contains the difference in frequency between the two signals.

In an alternate embodiment of the MMIC transceiver 12' as shown in FIG. 2b, the duplexer 24 and the coupler 25 of the original implementation as shown in FIG. 2a are replaced with a simple coupler 31 to allow for further cost savings and smaller size of the MMIC transceiver. The voltage controlled oscillator 20 and the two-stage transmit amplifier 21 and 23 are basically the same as in the original transmitter except in chip layout. The two-stage amplifier 27 and 29, and the balanced mixer 26 are similar to the original embodiment, except in chip layout and in that the balanced mixer 26 is further adapted to receive a leakage transmit signal which is used as the reference signal. The leakage signal is the result of the signal generated by the voltage controlled oscillator 20 being transmitted across a leakage path 39 from amplifier 23 to amplifier 29 across the new coupler 31. This alternate embodiment of the MMIC transceiver advantageously utilizes this leakage signal while providing isolation between the transmitter 50 and the receiver 52.

Figure 3:
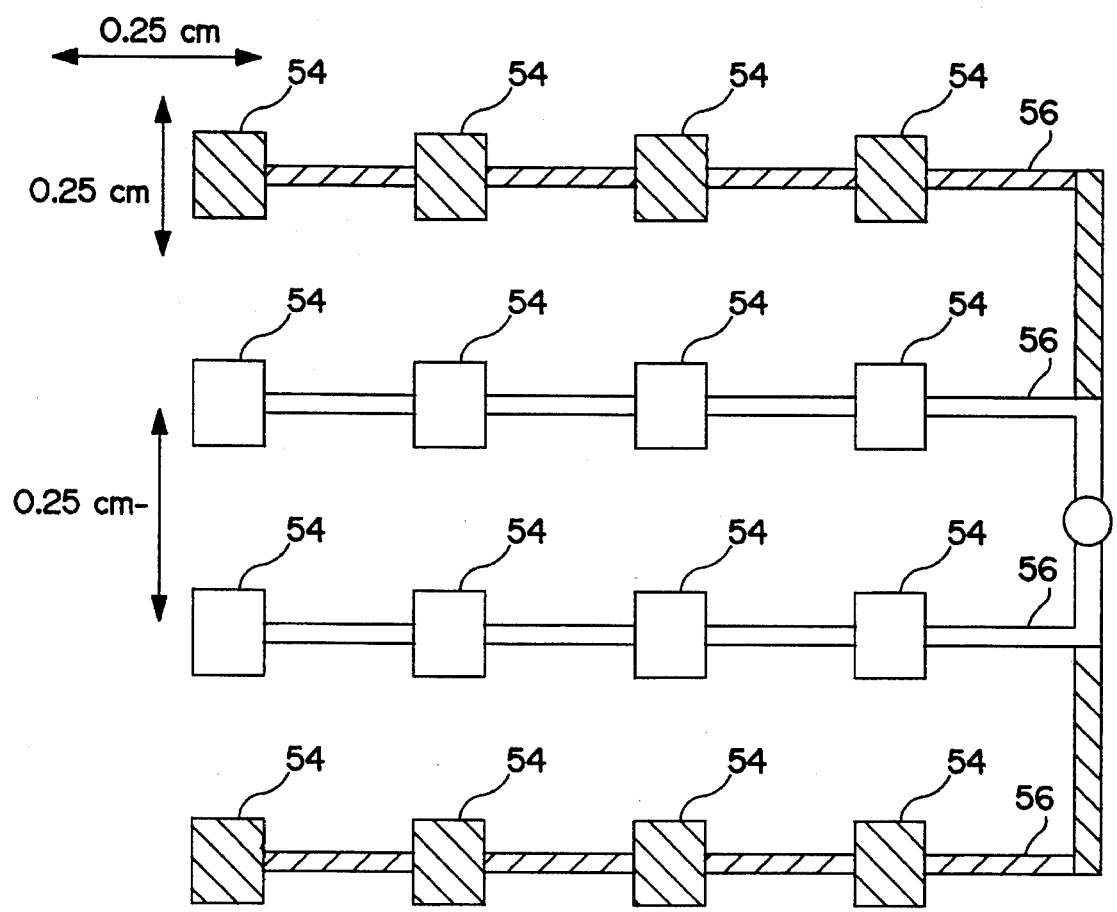
FIG. 3 is a schematic diagram which illustrates a millimeter wave band microstrip patch antenna design example.

FIG. 3 illustrates the antenna 14 designed as a millimeter wave band microstrip patch antenna. A plurality of radiating/receiving microstrip patches 54 are provided in a 4×4 array. In alternate embodiments, a 4×2 and a 4×1 array may also be used. Microstrip patches 54 are connected by microstrip feedlines 56. The antenna 14 is adapted to be etched on a printed circuit board and may be adapted to provide for a plurality of such microstrip patches 54 in various array designs. The array design essentially determines the beam shape which may be adapted to provide for various coverage requirements for different applications. The resulting antenna 14 is small and planar, and has a patch pattern that can easily be changed to adapt to various applications and mounting requirements. For automotive applications, the planar antenna enables incorporation of the radar sensor in the tail light assembly, side mirror assembly, or rear bumper of a vehicle. The particular antenna design example shown therein provides for an overall size which is less than 1.5 inches by 1.5 inches. However, various shapes and sizes may be used, depending on the particular application.

Figure 4:
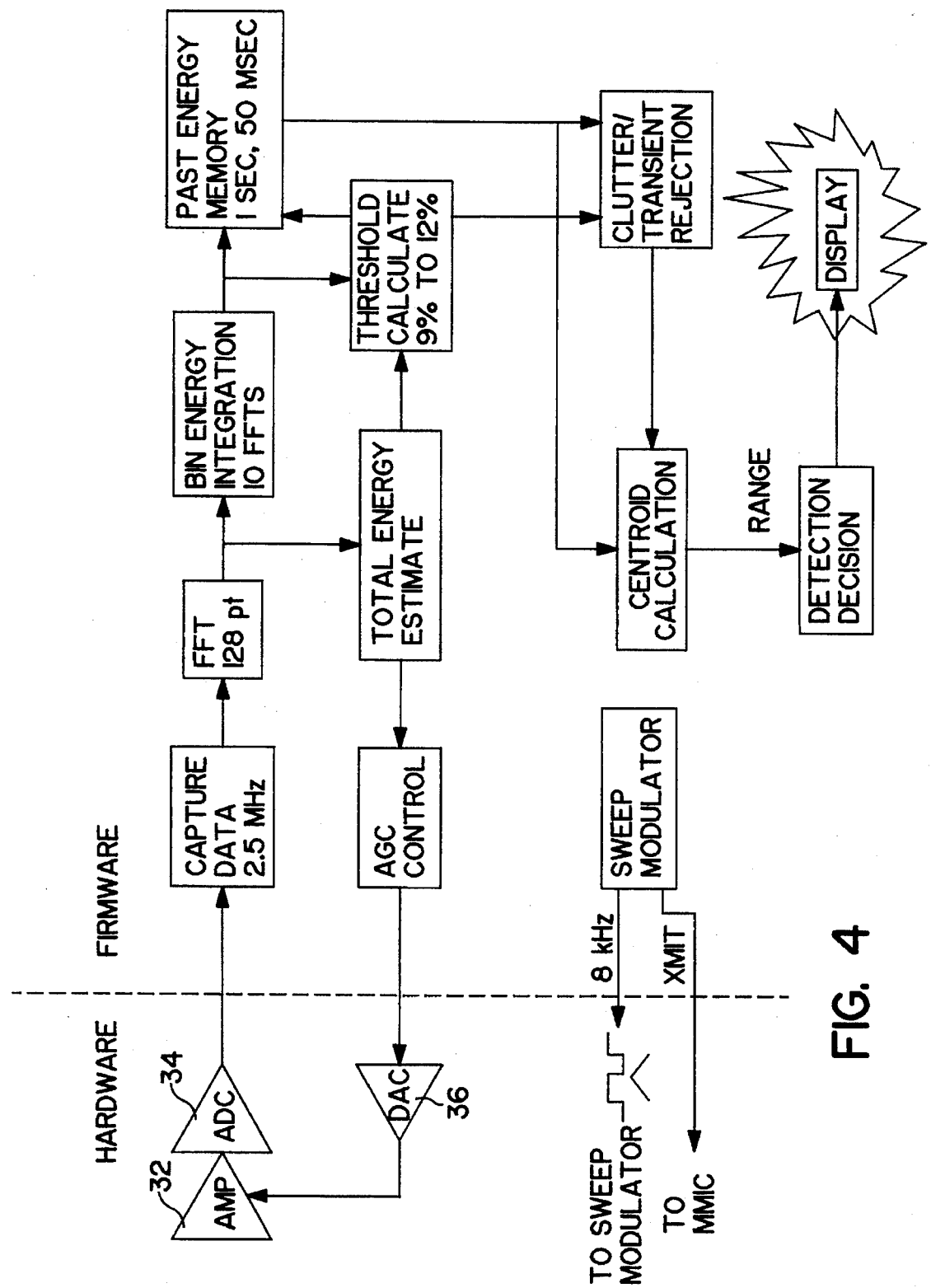
FIG. 4 is a block diagram which illustrates the major functions of a digital signal processor in accordance with the present invention.
Figure 5A:
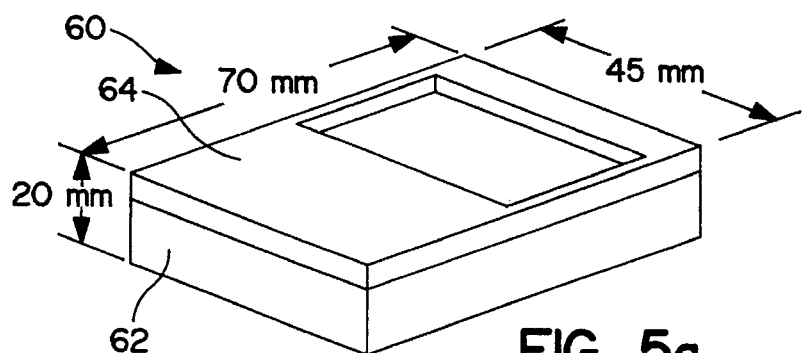
FIGS. 5a–5d are assembly views of a compact radar sensor module example.
Figure 5B:
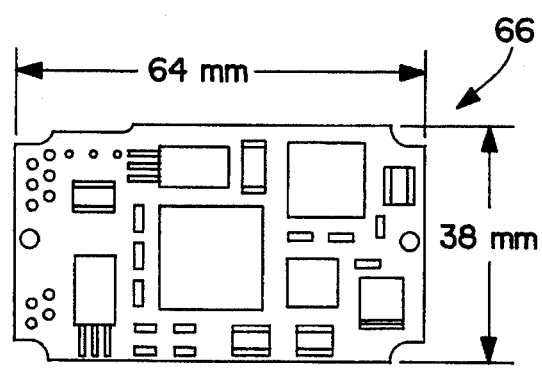
Figure 5C:
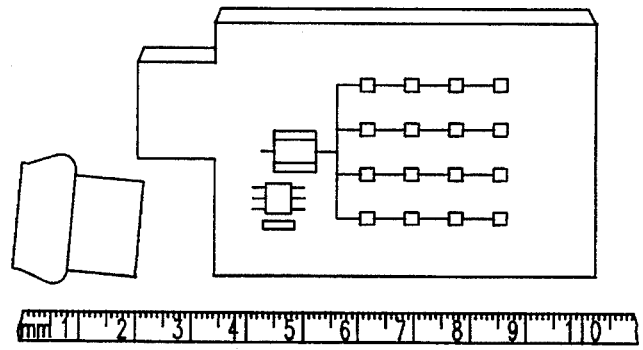
Figure 5D:
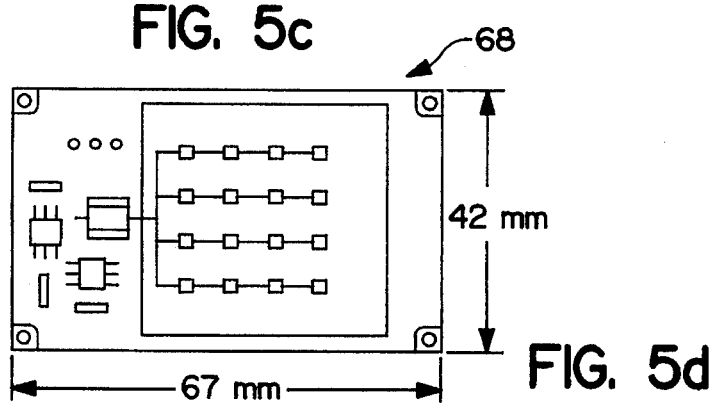
Figure 8A:
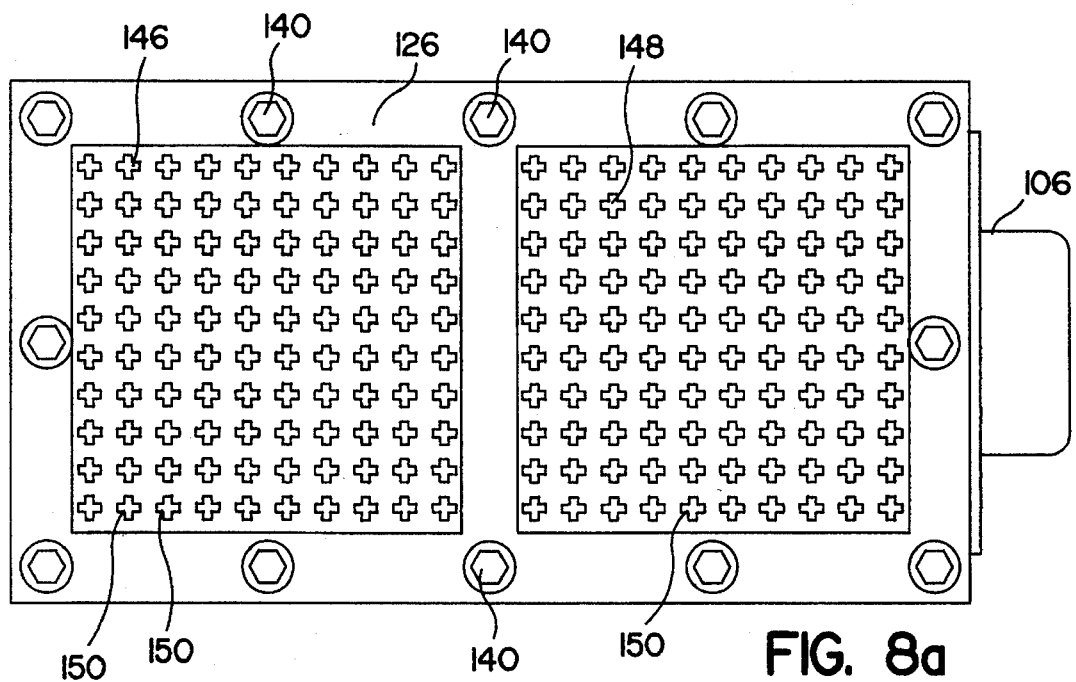
FIG. 8a is a top view of the radar system of FIG. 6 after assembly and further illustrating a frequency selective surface having cross dipole arrays.
Figure 8B:
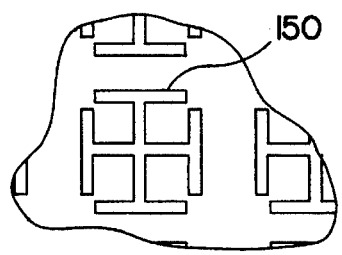
FIG. 8b is an enlarged view of one alternate frequency selective surface having Jerusalem cross dipole arrays.
Figure 9:
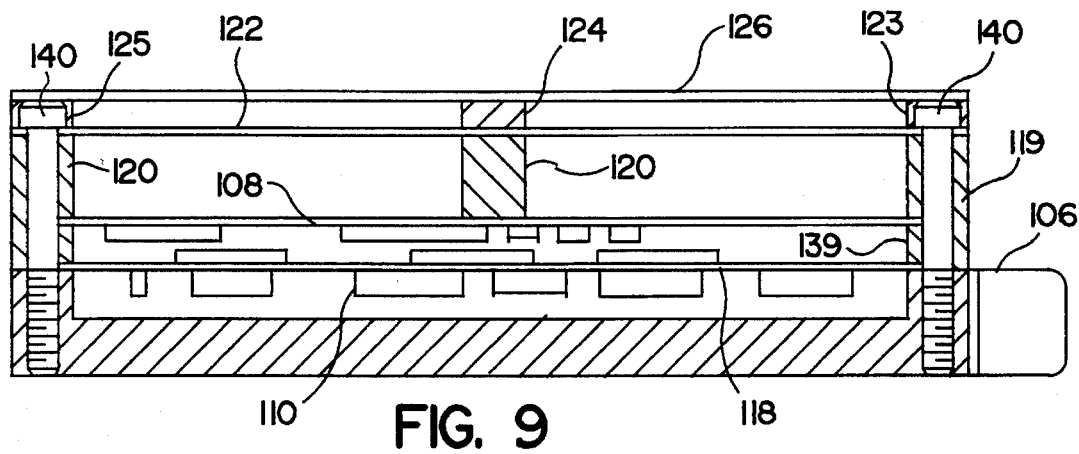
FIG. 9 is an end view of the assembled radar system of FIGS. 8a and 8b.

FIG. 4 is a block diagram which illustrates the major functions of the digital signal processor 16. The signal processing functions performed by the digital signal processor 16 include digital filtering and integration to remove clutter, reduce false alarms and to increase sensitivity. The embedded intelligence functions include decision logic, control, display, annunciation control, and self testing. The digital signal processor 16 performs these functions in firmware to achieve the lowest possible recurring costs. The firmware may include software such as machine code fabricated in read-only memory (ROM). The digital signal processor 16 reads the digitized data from the analog-to-digital converter 34 and calculates the gain control that is to be applied to the automatic gain control amplifier 32.

In operation, the firmware of digital signal processor 16 reads in a complete sweep of the radar data and captures the data at a sampling rate of about 2.5 megahertz. The digital signal processor 16 calculates a fast Fourier transform (FFT). The total energy is estimated from the FFT calculation and used to calculate the gain control signal which is applied to automatic gain control amplifier 32. The transformed data is further divided into range bins in order to detect valid returns. Several sweeps are transformed and accumulated, resulting in a 6 dB processing gain in the signal-to-noise ratio of the received signal. The digital signal processor 16 then weighs the spectrum to reduce the effects of clutter. A threshold decision function is applied to the range bins to detect valid returns. These returns are then compared to several past decisions from previous sweeps. By comparing past returns, the digital signal processor 16 adapts the decision thresholds and clutter weighing functions as the environment changes in order to increase differentiation of valid returns and reject disturbances and spurious returns. The digital signal processor 16 furthermore determines the closest valid return. Finally a periodically updated display provides the decision.

FIG. 5 illustrates the packaging design for a particular radar sensor example of this invention. A radar sensor module 60 is shown having a housing subassembly 62, a radome/cover 64 and an electronic subassembly having a support plate (not shown) and two printed circuit board assemblies 66 and 68. One of the printed circuit board assemblies 68 is laminated to the top of the support plate and has the patch antenna assembly etched thereon and the MMIC transceiver along with the preamplifier circuit. This assembly is connected by flexible jumper cable to the other multi-layer digital printed circuit board assembly 66 that is mounted to the rear portion of the support plate. This second printed circuit board assembly 66 has components mounted on both sides to minimize the module size. The radome/cover 64 is bonded over the top of the module 60 and provides impact protection as well as a moisture seal for the entire module 60. The invention discussed herein is not restricted to this particular module design, for different applications may require variations thereof.

Referring to FIGS. 6–9, a compact built-in packaging system for a radar system 100 includes a lower electronics housing 104 with an integral connector 106. While the lower housing 104 in FIG. 6 is rectangular in shape, other shapes are contemplated. A dielectric substrate 108 includes a radar circuit 110 mounted on a bottom surface 112 thereof (see FIG. 7). A ground plane 114 is formed on a top surface 115 of the dielectric substrate 108. Slots 116 and 117 in the ground plane 114 transmit and receive electromagnetic energy as will be described further below.

The lower housing 104 positions and supports a digital signal processing circuit (DSPC) 118. The DSPC 118 can be the DSPC disclosed in conjunction with FIGS. 1–5, or a conventional DSPC can be used. A frame 119 including transmit and receive openings 120 and 121 is positioned over the dielectric substrate 108 to provide uniform spacing between the dielectric substrate 108 and a frequency selective surface (FSS) 122, described further below. A spacer 123 including transmit and receive openings 124 and 125 is positioned on an upper surface of the FSS 122. A radome 126 protects the radar system 100 from harmful effects of the environmental conditions in which the radar system 100 is operated (e.g., rain, dust, mud, etc.) without noticeably affecting the performance of the radar system 100.

The radome 126 can be made from a variety of materials. Transmission data for multiple materials through which the radar system 100 radiates and receives the transmit and reflected signals is illustrated in Table A (set forth below). "Transmission" refers to the percent of the transmitted signal which is radiated without absorption by the material. As can be seen from Table A, many different materials can be effectively utilized.

TABLE A

| Material | Thickness (mil) | Freq (GHz) | Transmission |
|---|---|---|---|
| Mylar | 5 | 35 | 99.5 |
|  |  | 140 | 95.0 |
| Teflon | 60 | 35 | 92.0 |
|  |  | 140 | 95.0 |
| Lexan | 55 | 35 | 72.0 |
|  |  | 140 | 81.0 |
| Lexan (coated) | 55 | 35 | 68.0 |
|  |  | 140 | 80.0 |
| Plexiglass | 375 | 35 | 60.0 |
|  |  | 140 | 60.0 |
| Plexiglass | 250 | 140 | 70.0 |
| Polyethylene | 5 | 35 | 99.0 |
|  |  | 140 | 100.0 |

The radar circuit 110 located on the bottom surface of the substrate 108 can include a MMIC transceiver 132, microstrip feedlines 134 and 136 connected to slots and 117, and an IF/modulator circuit (IF/MC) 138 described in detail above in conjunction with FIGS. 1–5. A rectangular spacer 139 can be used to position the substrate 108 with respect to the DSPC 118, although other means for spacing are contemplated. Fasteners 140 connect the lower housing 104, the DSPC 118, the dielectric substrate 108, the frame 119, the FSS 122, the spacer 123, and the radome 126 into a compact integral unit. The radome 126 can be attached to the spacer 123. Alternately, the radome 126 can include a plurality of holes for receiving the fasteners 140, or the spacer 123 can be formed integrally with the radome 126. The dielectric substrate 108, the frame 119, and the lower housing unit 104 enclose the radar circuit 110 and the DSPC 118 in a hermetically sealed environment.

The FSS 122 is a perforated plate made of metal or metal-coated plastic. The FSS 122 includes a transmit aperture 146 and a receive aperture 148 each including a plurality of uniformly spaced holes 150. The FSS 122 is positioned above the substrate 108. Slots 116 and 117 which are fed by the microstrip feedlines 134 and 136 transmit and receive electromagnetic energy. The microstrip feedlines 134 and 136, the slots 116 and 117 formed in the ground plane 114, the frame 119, the dielectric substrate 108, and the FSS 122 form an integral antenna 144 for the radar system 100 while also forming part of an enclosure for the radar system 100.

Both the IF/MC 138 and the microstrip feedlines 134 and 136 are fabricated on the bottom surface 112 of the substrate 108 which can be made of Alumina or Quartz. The ground plane 114 fabricated on the top surface 115 of the substrate 108 using metal, for example copper or gold.

Figure 10A:
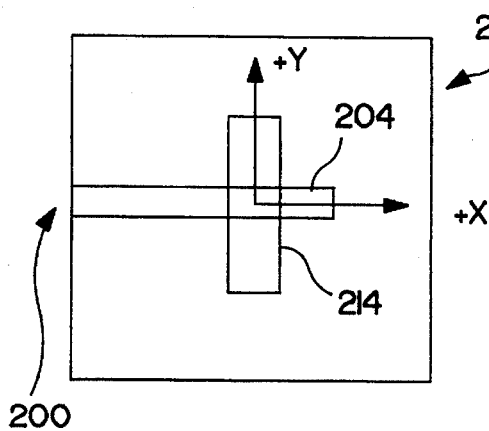
FIG. 10a is a top view of a slot radiator according to the prior art.
Figure 10B:
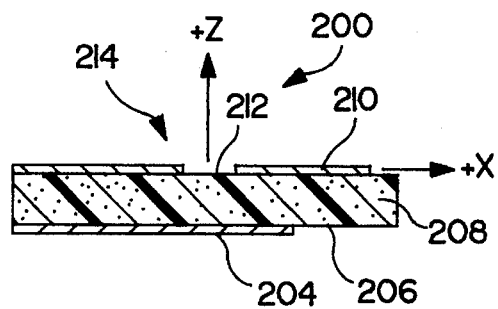
Figure 11A:
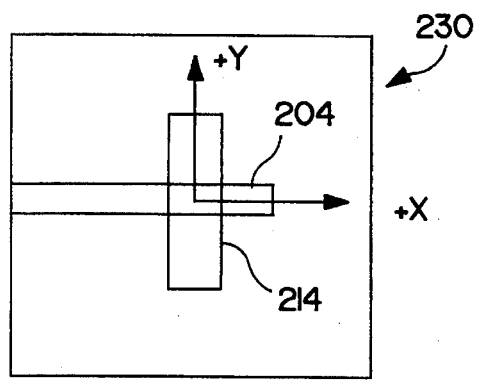
FIG. 11a is a top view of a slot radiator including a reflector ground plane according to the prior art.
Figure 11B:
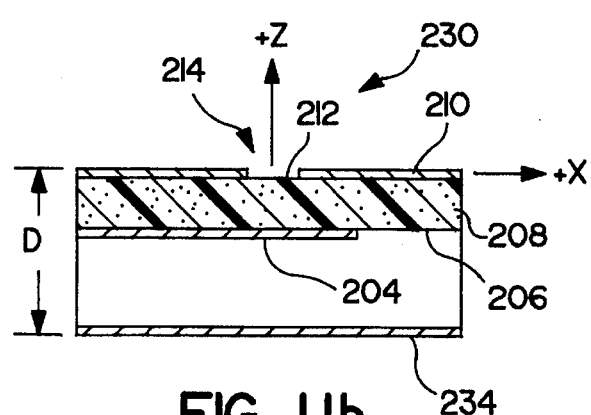

FIGS. 10, 11 and 12 illustrate several prior art antenna radiation configurations. FIG. 10a is a top view of and FIG. 10b is a side view of a slot radiator antenna 200 including a microstrip feedline 204 formed on a bottom surface 206 of a dielectric substrate 208. A ground plane 210 formed on a top surface 212 of the dielectric substrate 208 includes a slot 214 which radiates into an upper half-space (+Z direction) above the ground plane 210 and into a lower half-space (−Z direction) below the ground plane 210. It is desirable to maximize electromagnetic radiation in one direction in the Z plane (typically away from radar electronics) while minimizing electromagnetic radiation in an opposite direction in the Z plane, e.g. where a radar or other circuits may be located.

Two configurations are offered by conventional antenna designs for obtaining maximum radiation in one direction in the +Z plane while minimizing radiation in the opposite direction in the −Z plane including a reflector ground plane configuration 230 illustrated in FIG. 11, and a slot-coupled patch configuration 232 illustrated in FIG. 12.

For purposes of clarity, reference numerals will be used from FIG. 10a where appropriate. The reflector ground plane configuration 230 in FIGS. 11a and 11b includes a reflecting ground plane 234 which reflects radiation in the −Z direction 180 degrees, in other words, in the +Z direction. If the ground plane 210 is spaced a distance "D" (which is approximately one quarter wavelength) from the reflecting ground plane 234, the reflected electromagnetic radiation from the reflecting ground plane 234 in the +Z direction is in phase with radiation emitted in the +Z direction by the ground plane 210.

However, the reflector ground plane configuration 230 cannot be effectively used with the integrated radar sensor 100 of the present invention. First, electromagnetic fields traveling between the ground plane 210 and the reflecting ground plane 234 adversely affect electronics located therebetween, for example the IF/MC 138, the DSPC 118, the microstrip feedline 134, etc. Second, the space "D" between the reflecting ground plane 234 and the ground plane 210 may be insufficient to accommodate the electronics located therebetween.

Figure 12A:
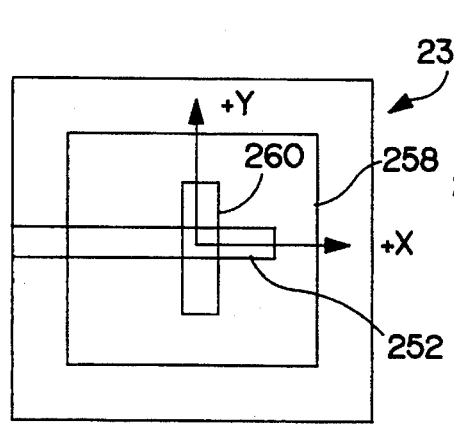
FIG. 12a is a top view of a slot-coupled patch radiator according to the prior art.
Figure 12B:
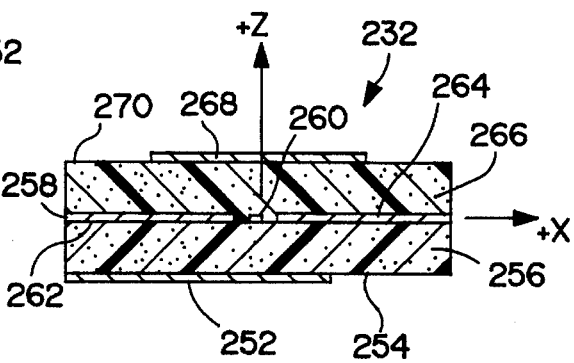

The conventional slot-coupled patch configuration 232 in FIGS. 12a and 12b includes a microstrip feedline 252 etched on a bottom surface 254 of a first dielectric substrate 256. A ground plane 258 having a slot 260 formed therein is fabricated on a top surface 262 of the first dielectric substrate 256. A bottom surface 264 of a second dielectric substrate 266 is in contact with the ground plane 258. A patch 268 is fabricated on a top surface 270 of the second dielectric substrate 266 and is designed to match impedance in the +Z direction to an impedance of the microstrip feedline 252 to obtain maximum electromagnetic energy transfer. In other words, the patch 268 creates a condition favoring flow of electromagnetic energy in the +Z direction. A length of the slot 260 is typically less than a resonant length to further reduce electromagnetic radiation in −Z direction.

However the slot-coupled patch configuration 232 cannot be effectively used with the integrated radar sensor 100 of the present invention. First, the slot-coupled patch configuration 232 has low efficiency due to high material loss at microwave frequencies. Second, the slot-coupled patch configuration 232 has a less rigid structure due to the first and second dielectric substrates 256 and 266 which are typically thin.

FIGS. 13a and 13b illustrate the integral antenna 144 of the present invention in detail. The microstrip feedline 134 is etched on the bottom surface 112 of the dielectric substrate 108. The ground plane 114 is fabricated on the top surface 115 and includes the slots 116 and 117 (not shown in FIGS. 13a and 13b) formed therein. The FSS 122 is spaced (by the frame 123) above the ground plane 114 with air, acting as a dielectric, located therebetween.

The FSS 122 according to the invention differs from conventional frequency selective surfaces. Traditionally, frequency selective surfaces include cross dipole (or Jerusalem cross, tripole, dipole, rectangular, circular disk) arrays etched on a dielectric substrate. In other words, metal such as copper is deposited or printed on the dielectric substrate in the particular shape chosen. Traditional frequency selective surface designs have been the subject of extensive study, for example see Agrawal & Imbriale, "Design of a Dichroic Subreflector", IEEE Transactions On Antennas and Propagation, Vol. AP-27, No. 4, July 1979; Chen, Ingerson & Chen, "The Design of Wide-band Sharp Cut-off Dichroic", IEEE Antennas and Propagation Symposium, Vol. 2, p. 708–711; and Tsao & Mittra, "Spectral-domain Analysis of Frequency Selective Surfaces Comprised of Periodic Arrays of Cross Dipoles and Jerusalem Crosses", IEEE Transactions On Antennas and Propagation, Vol. AP-32, No. 5, May 1984. All of the above are hereby incorporated by reference.

In contrast, the FSS 122 of the present invention (see FIG. 8*a*) is fabricated using a metal plate with holes 150 which can be in the shape of a cross, Jerusalem cross, tripole, dipole, rectangle or circle. Other shapes will be readily apparent. The radiation patterns and impedances for each of the shapes are known, for example, the impedance and radiation patterns of the conventional cross and Jerusalem cross (see FIG. 8*b*) formed on a dielectric substrate are discussed in the above incorporated references. Using Babinet's principle, the radiation patterns for the FSS 122 according to the invention can be derived. Babinet's principle is discussed in C Balanis "Antenna Theory: Analysis & Design", page 497; T. Kong "Electromagnetic Wave Theory", page 366; and T. Milligan "Modern Antenna Design", page 70. All of the above are incorporated by reference.

The FSS 122 of the present invention is a complementary radiating structure to the conventional cross and Jerusalem cross radiators. The FSS 122 is a complimentary structure because when the FSS 122 is combined with the conventional cross (or other shape), a solid screen with no overlaps is formed. Extension of these principles to other shapes will be readily apparent.

The impedance, and the magnetic and electric fields of the FSS 122 can also be predicted from the impedance, and the magnetic and electric fields of the conventional cross (or other shape). Briefly, the magnetic field of the conventional cross radiator (or other shape) is related to the electric field of the complimentary FSS 122. Similarly the electric field of the conventional cross (or other shape) radiator is related to the magnetic field of the FSS 122. The impedances of the conventional cross (or other shape) radiator and the FSS 122 are related to the intrinsic impedance of a medium in which the conventional radiating structure and the FSS 122 are located. The impedance provided by the FSS 122 is also related to the distance between the FSS 122 and the ground plane 114.

The FSS 122 matches the impedance of the upper half-space (e.g. in the +Z direction) to the impedance of the microstrip feedlines 134 and 136 with significantly higher efficiency than the patch antenna 232. Since the FSS 122 is made of metal or metal-coated plastic, the integral antenna 144 is more rigid and durable than conventional designs thus improving the packaging of the radar system 100.

Referring to FIGS. 14*a* and 14*b*, a vehicle 300 incorporating the compact packaging radar system 100 is illustrated. The vehicle 300 includes a side view mirror 304 attached to a side door 305 or other component of the vehicle 300. The side view mirror 304 includes an outer housing 306 and a mechanism (not shown) for supporting and positioning a mirror 308. A window is cut from the mirror 308, and the radar system 100 is attached in the window. Alternately, if materials having proper electromagnetic properties are used, the radar system 100 can be mounted to a rear surface 310 of the mirror 308.

Alternately, the radar system 100 can be incorporated into a rear tail light assembly 320 of the vehicle 300. The rear tail light assembly 320 can include a bulb assembly 322 which illuminates through a cover 324 which can be made of plastic. The radar system 100 can be mounted on an inside surface 330 of the cover 324 of the rear tail light assembly 320, and can radiate and receive the transmit and receive signals through the cover 324 which serves as an integrated radome to replace radome 126. As can be appreciated, the cover 324 should have electromagnetic properties allowing flow of electromagnetic radiation flow therethrough. Alternately, a window can be cut from the cover 324 allowing electromagnetic radiation to directly impinge upon the radome 126 of the radar system 100.

The radar system 100 mounted on the vehicle 300, such as an automobile, can be used in intelligent cruise control systems, collision avoidance systems, predictive crash systems, lane change systems, back-up warning systems, vision enhancement systems, ground speed measuring systems, ground height measuring systems, etc. As can be appreciated, while the radar system 100 is described above in conjunction with the vehicle 300 such as an automobile, other applications will be readily apparent. For example, the radar system can be used in police radar systems or in perimeter surveillance systems. The radar system can also be used as a phased array antenna for communications systems and other radar applications.

RADAR SIGNAL PROCESSOR

The radar sensors disclosed above generate a significant amount of data which must be analyzed by signal processors to provide target data signals, for example estimated range and range rate (relative speed or velocity) signals of a target, which, in turn, are used to generate control signals, for example, to trigger a buzzer and/or an indicating light, to actuate a brake, etc. Such target data signals must be provided quickly by the radar signal processor (RSP) 380, otherwise the target data signals (for example, the estimated range and relative speed signals) become invalid estimates. If the radar sensors are to be incorporated in mass-produced vehicles, the radar signal processor must be relatively inexpensive.

Figure 15:
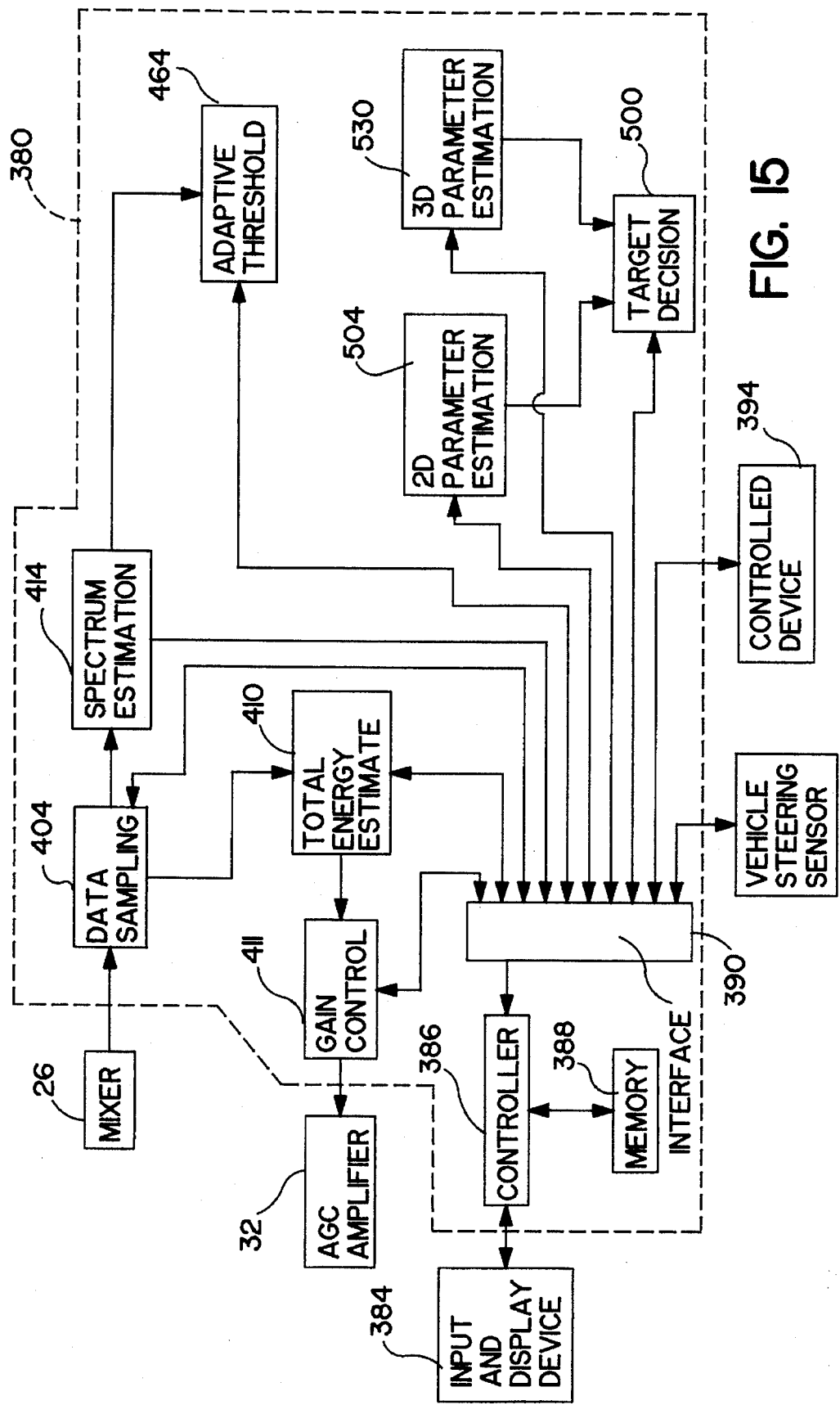
FIG. 15 is an electrical block diagram of a radar signal processor according to the invention.
Figure 16:
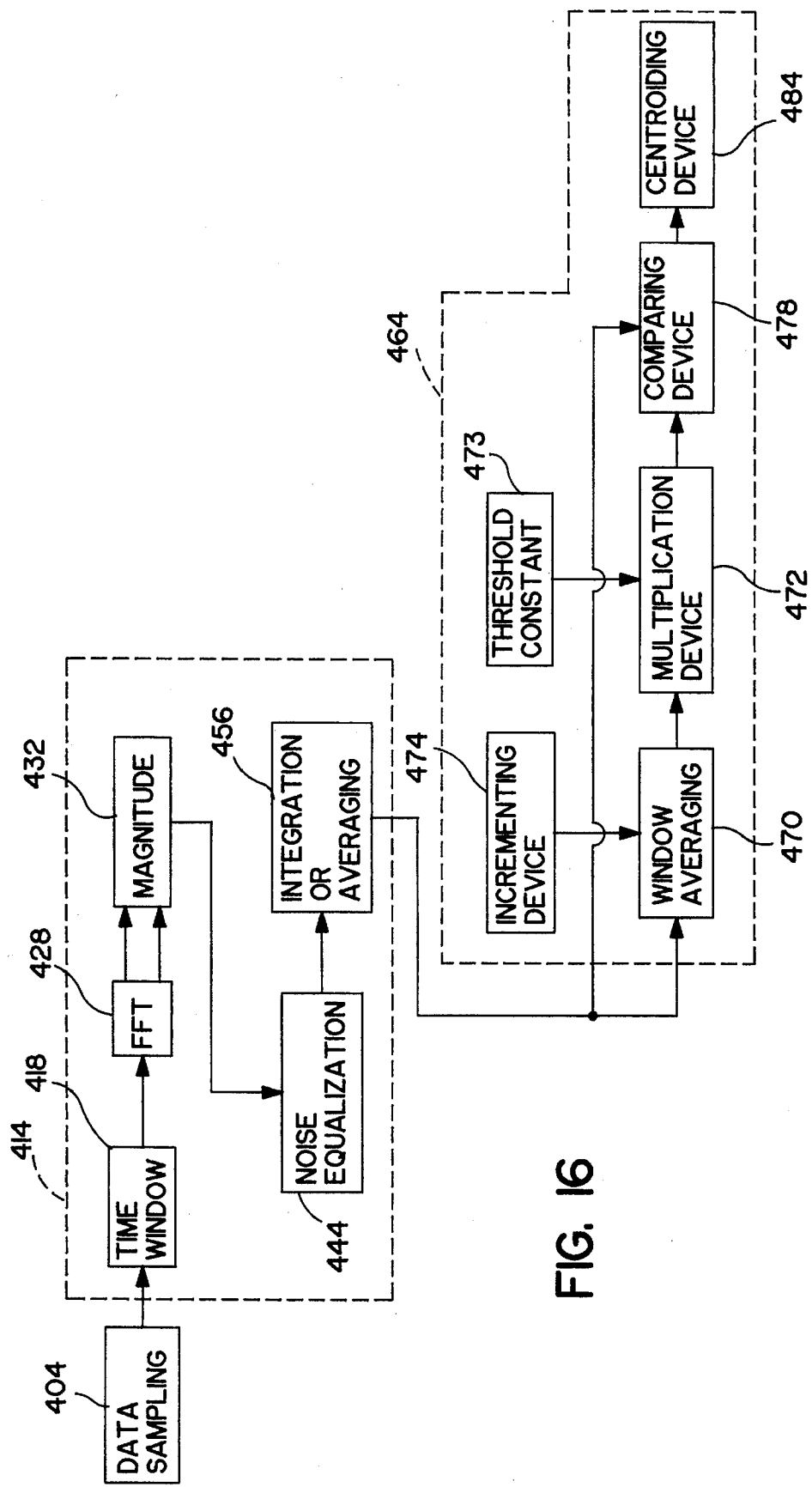
FIG. 16 is an electrical block diagram of a spectrum estimation device and an adaptive threshold device of FIG. 15 in further detail.

Referring to FIGS. 15 and 16, a radar signal processor (RSP) 380 according to the present invention which can be connected to the radar sensor 10 of FIG. 1 is shown. While the RSP 380 will be described in conjunction with the radar sensor 10, the RSP 380 can be readily used with conventional radar sensors. The RSP 380 can be connected with an input and display device 384, a controller 386 and a memory 388 (which can include RAM, ROM etc.) via an interface 390, for example, a RS-232 connector. The controller 386 and the RSP 380 together interact with a controlled device 394, as will be described further below.

The RSP 380 includes a data sampling device 404 which samples an output of the balanced mixer 26 of the radar sensor 10 in FIG. 1. The RSP 380 initiates linear sweeps of the radar voltage controlled oscillator (VCO) 20. The mixer 26 in the transceiver 12 shown in FIG. 1 combines the transmit signal with the reflected signal to generate a mixer output signal related to the range of a detected target. If multiple targets are detected, the mixer output signal is a sum of frequencies corresponding to each target.

Figure 17:
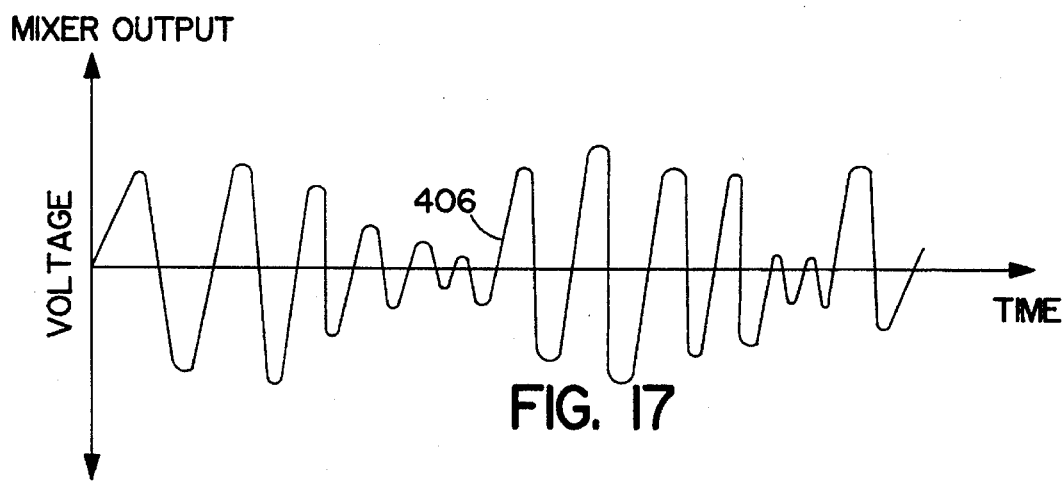
FIG. 17 illustrates a sampled mixer output signal generated by a data sampling device of FIG. 15.
Figure 18:
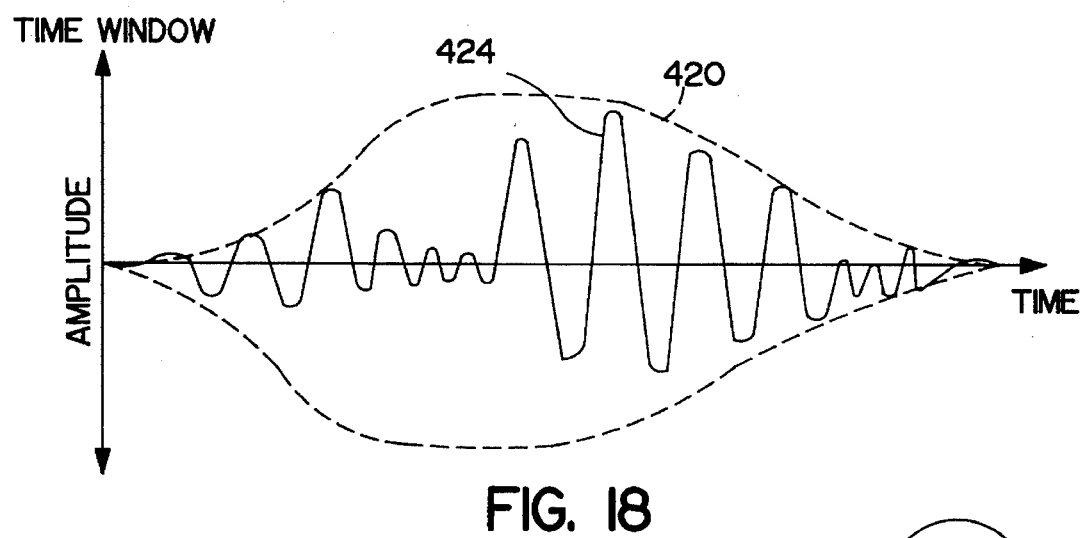
FIG. 18 illustrates a time domain window function and a windowed signal generated by a time domain window device of FIG. 16.

Referring to FIGS. 15–19, the data sampling device 404 samples the mixer output signal and generates a sampled mixer output signal 406 which is illustrated in FIG. 17. An energy estimation device 410 estimates the total energy of the sampled mixer output signal 406 and a gain control device 411 generates a gain control signal for the automatic gain control (AGC) amplifier 32 which is in the signal path of the mixer 26 in FIGS. 1 and 15. A spectrum estimation device 414 estimates the spectrum of the sampled mixer output signal from the data sampling device 404, as will be described further below.

SPECTRUM ESTIMATION

The spectrum estimation device 414 includes a time domain window device 418 which multiplies the sampled mixer output signal 406 generated by the data sampling device 404 with a time domain window function 420, for example a raised cosine function, to generate a windowed signal 424. The time domain window device 418 decreases spectral leakage and outputs the windowed signal 424 to a fast Fourier transform (FFT) device 428 which generates a frequency spectrum signal. The frequency spectrum signal includes a series of spectral components.

Figure 19:
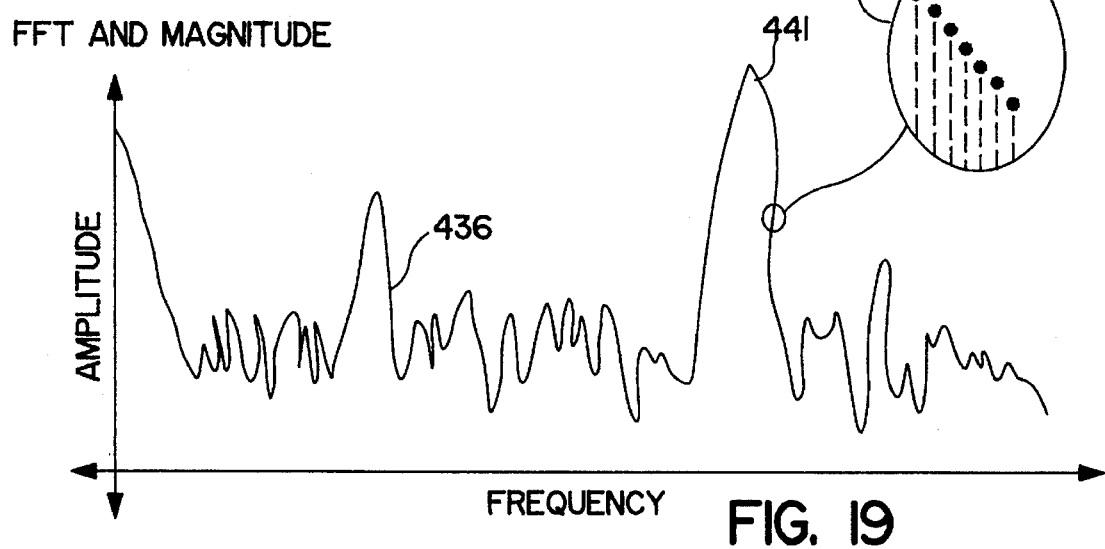
FIG. 19 illustrates a magnitude range profile signal including a plurality of range bins generated by a magnitude determining device and a fast fourier transform device of FIG. 16.

A magnitude determining device 432, connected to the FFT device 428, calculates the magnitude of the spectral components, and generates a magnitude range profile signal 436. The magnitude range profile signal 436 includes a plurality of range bins (magnified portion 440 in FIG. 19 illustrates several adjacent range bins). Each range bin is associated with a spectral component and contains the magnitude of the associated spectral component. In other words, the frequency axis in FIG. 19 is divided into a plurality of range bins. The magnitude of each spectral component is related to signal strength at a particular frequency. Signal strength relates to the presence or absence of targets at a given range. In addition, the frequency of a peak, for example peak 441, is related to the distance to a target. While the plurality of range bins, each containing the magnitude of the spectral component, are illustrated as a continuous curve in FIG. 19, those skilled in the art can appreciate that the plurality of range bins are discrete magnitudes (or amplitudes) for closely spaced range bins.

The magnitude determining device 432 outputs the magnitude range profile signal 436 to a noise equalization device 444. Because the sampled mixer signal 406 has a noise characteristic which increases with decreasing frequency, the magnitude range profile signal 436 is equalized by the noise equalization device 444 to produce an equalized range profile signal 446 having a noise floor that is constant with respect to frequency. Note that the equalized range profile signal 446 also has range bins as illustrated by magnified portion 452 in FIG. 20.

Figure 20:
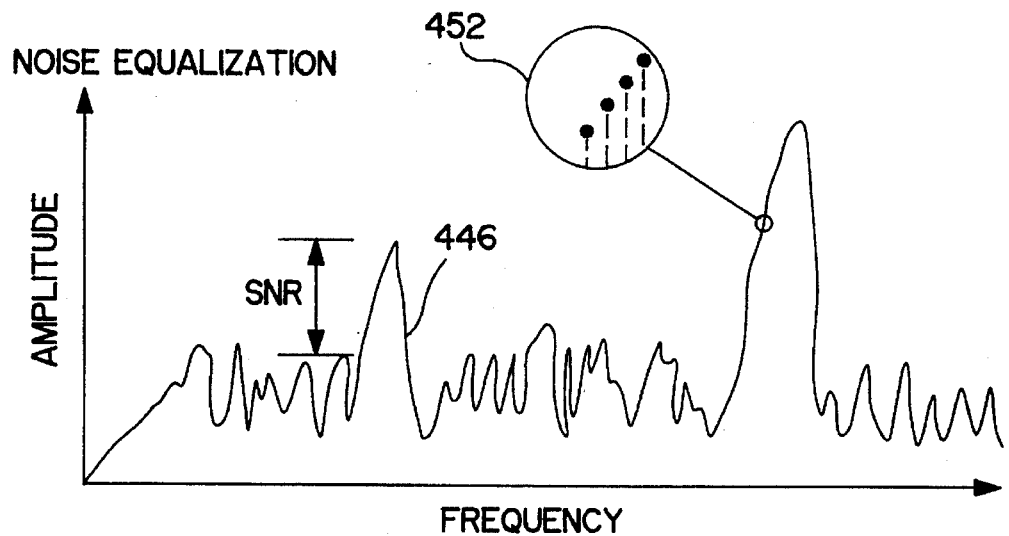
FIG. 20 illustrates an equalized range profile signal generated by a noise equalization device of FIG. 16.
Figure 21:
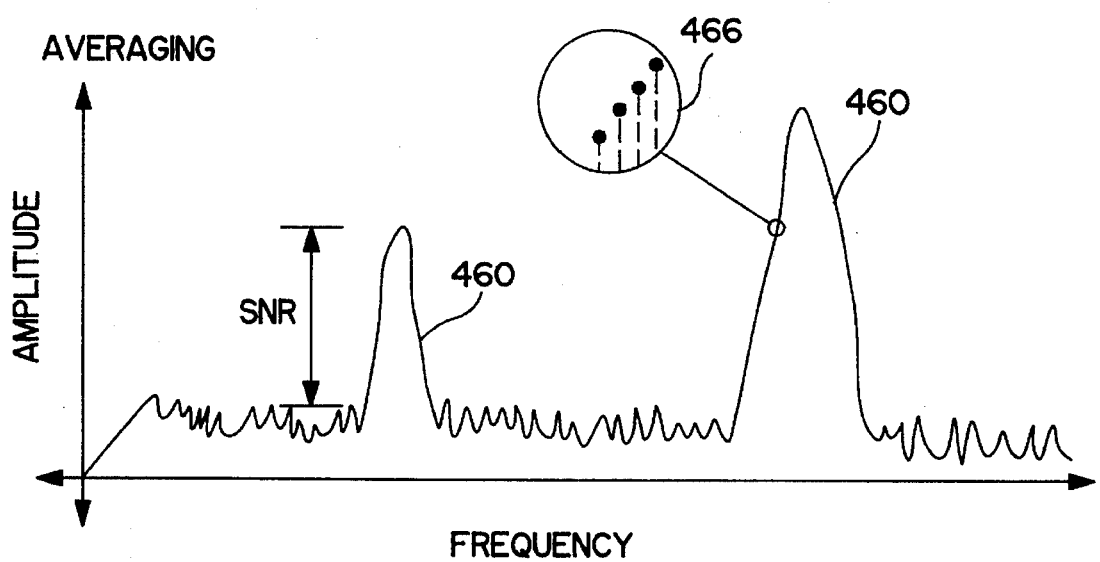
FIG. 21 illustrates an integrated range profile signal including a plurality of range bins generated by an averaging device of FIG. 16.

The noise equalization device 444 outputs the equalized range profile signal 446 to an averaging or integration device 456 which integrates the equalized range profile signal 446 with prior equalized range profile signals to increase signal to noise ratio (SNR) which increases the detection probability (compare SNR in FIG. 20 and 21). The integrated range profile signal 460 also includes numerous range bins as illustrated by magnified portion 466 in FIG. 21. The averaging device 456 generates an integrated range profile signal 460 which is output to an adaptive threshold device 464, described further below.

ADAPTIVE THRESHOLDING

Figure 22:
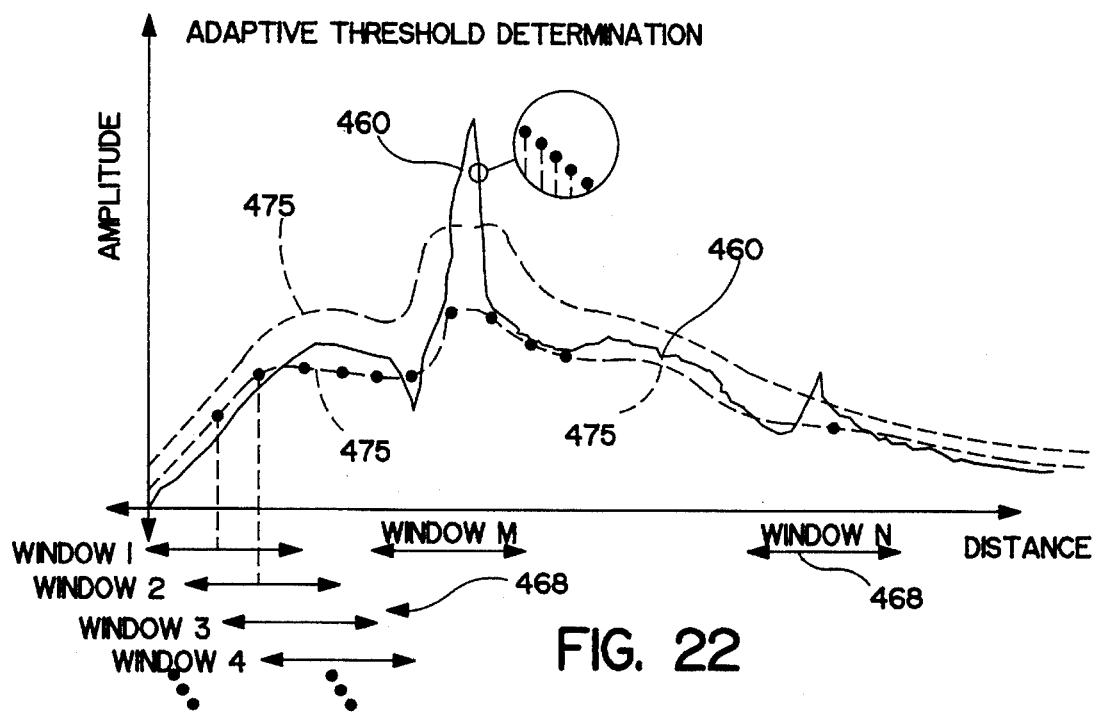
FIG. 22 illustrates a threshold range profile signal generated by the adaptive threshold device of FIG. 16 and the integrated range profile signal.

The adaptive threshold device 464 evaluates signal strength of each range bin and generates target flags in the range bins to indicate the presence or absence of a target. The adaptive threshold device 464 defines a moving window 468 (using a window averaging device 470 illustrated in FIG. 16) which includes a plurality of range bins, for example nine range bins. As can be appreciated, additional or fewer range bins can be used. In FIG. 22, "window 1" refers to the moving window at position 1, . . . , "window N" refers to the moving window at position N, etc. The window averaging device 470 averages the magnitude of range bins of the integrated range profile signal 460 for each window. For example, in FIG. 22, the window averaging device 470 averages range bins 0–8 (window-averaged range profile signal shown at 475), a multiplication device 472 multiplies the average by a threshold constant stored in device 473, and stores a detection threshold value (for example in center range bin 4). As can be appreciated, the moving window is incremented (by an incrementing device 474 in FIG. 16) and the adaptive threshold device generates other detection threshold values which will collectively be called a threshold range profile signal 476. Continuing with the above example, the moving window is incremented and range bins 1 through 9 are averaged, multiplied by the threshold constant and stored in range bin 5 of the threshold range profile signal. The moving window is incremented and additional values are stored for other range bins until the threshold range profile signal is generated for the entire integrated range profile signal. Alternatively, the averages can be stored in an averaged window range profile and later multiplied by the threshold constant. Still other variations are readily apparent. A comparing device 478 compares the integrated range profile signal to the threshold range profile signal and generates a target flag for each range bin in the integrated range profile signal above an associated range bin in the threshold range profile signal.

The adaptive threshold device 464 can use a third approach, the coincidence method, if desired, which compares the integrated range profile signal for a given range bin to subsequent integrated range profile signals generated for the same range bin. The coincidence method requires the integrated range profile signal for the same range bin to be above the detection threshold for at least M out of N integrated range profile signals. The coincidence method greatly reduces false alarms since the probability of several false alarms for the same range bin over successive integrations is very low.

Figure 23:
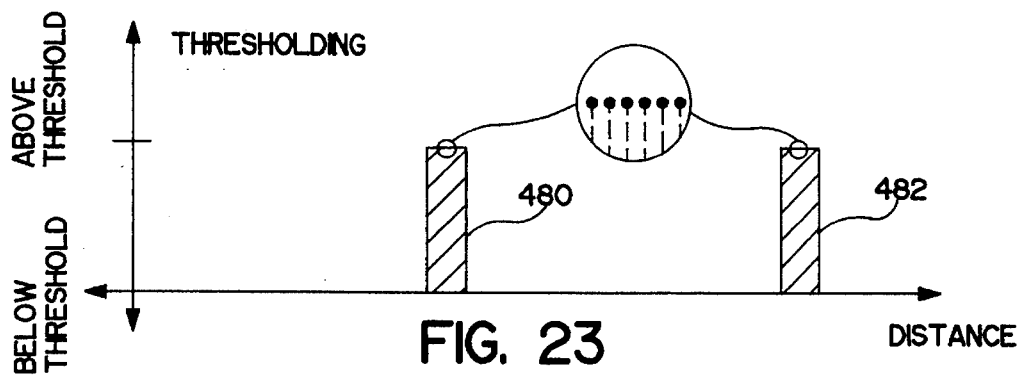
FIG. 23 illustrates flags generated when the integrated range profile signal exceeds the threshold range profile signal as performed by the adaptive threshold device of FIG. 16.
Figure 24:
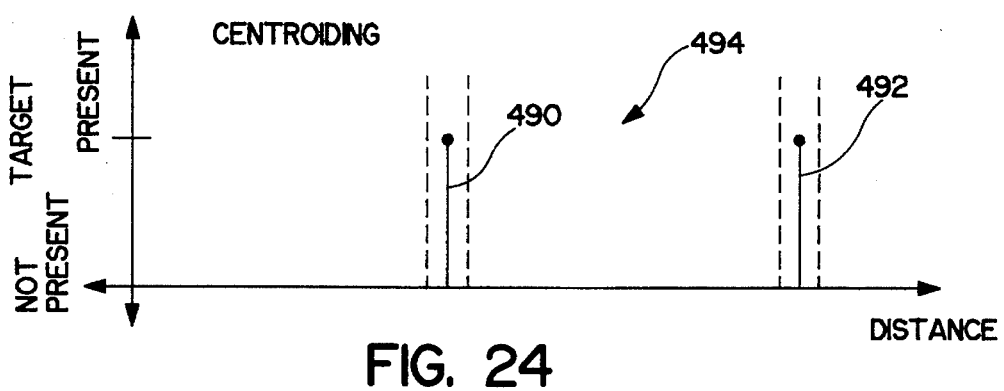
FIG. 24 illustrates centroiding performed on the flags generated in FIG. 23 by the adaptive threshold device of FIG. 16.

As can be appreciated, the adaptive threshold device 464 can generate flags for several adjacent range bins when the adjacent range bins of the integrated range profile are above the range bin for the associated threshold range profile signal. The adaptive threshold device 464 assumes adjacent flags at 480 in FIG. 23 were triggered by one target, e.g. the first target, performs centroiding using a centroiding device 484 to reduce the flags in adjacent range bins at 480 to a single range value at 490 (FIG. 24). Additional centroiding is performed on other clusters of target flags in adjacent range bins, for example, at 482 in FIG. 23 to generate a single range value at 492 in another central range bin. As such, the adaptive threshold device 464 performs centroiding to generate a target profile signal 494. The example target profile signal 494 illustrated in FIG. 24 includes two spaced targets.

Figure 25:
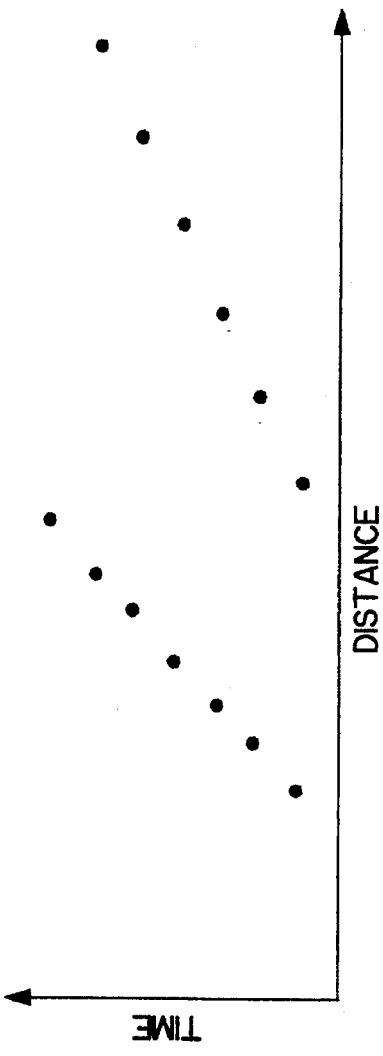
FIG. 25 illustrates a target space array including a stack of past target profile signals as maintained by the adapted threshold device of FIG. 16.
Figure 26:
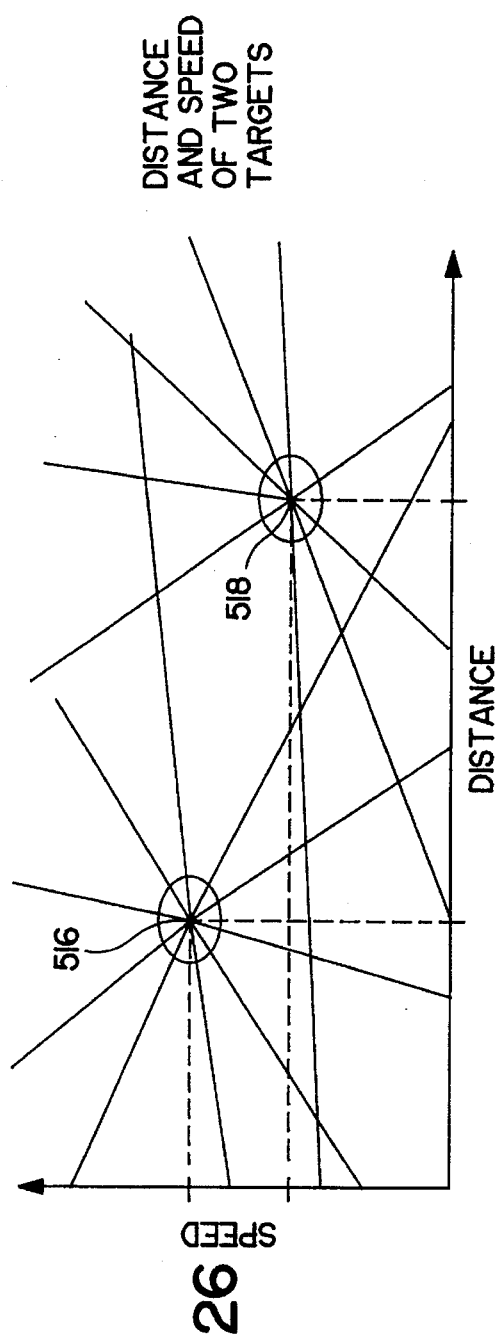
FIG. 26 illustrates Hough transforms performed by a 2-D parameter estimation device of FIG. 15 on target space arrays provided by the adaptive threshold device.

After centroiding, the adaptive threshold device 464 adds the target profile signal to a stack of past target profile signals to generate a target space array illustrated in FIG. 25 and discards the oldest target profile array in the target space array. The adaptive threshold device 464 is connected to a target decision device 500 which executes two modes during operation: acquisition and tracking.

TARGET DECISION DEVICE—2-D PARAMETER ESTIMATION

By default, the target decision device 500 executes an acquisition mode by triggering a 2-D parameter estimation device 504 which performs computations on the 2-D target space array generated by the adaptive threshold device 464 to estimate the speed of and the distance to each target. The 2-D parameter estimation device 504 generates a 2-D estimation signal including components related to the speed of and distance to possible detected targets.

The target decision device 500, connected to the 2-D parameter estimation device 504, evaluates the 2-D estimation signal and determines whether a valid target exists. Only targets greater than the threshold range profile signal are analyzed using the Hough transform, and only the target paths that correlate closely enough to constant velocity motion pass the thresholding in 2-D Hough space. A target is valid if it persists over enough thresholding intervals, and if its path is correlated to a relatively non-accelerating path. If the target decision device 500 determines that a valid target exists, the target decision device 500 ends the acquisition mode and initiates the tracking mode. Alternatively, the 2-D parameter estimation device 504 can output the 2-D estimation signal to the controller 386 via the interface 390. The controller 386 can determine whether a valid target exists and trigger the target decision device 500 into the tracking mode. The controller 386 can initiate other action if necessary.

To estimate the speed of and the distance to targets during the acquisition mode, the adaptive threshold device 464 outputs the 2-D target space arrays to the 2-D parameter estimation device 504. The target profiles together with the timing information define the 2-D target space array (range and time) which is illustrated in FIG. 25.

Figure 27:
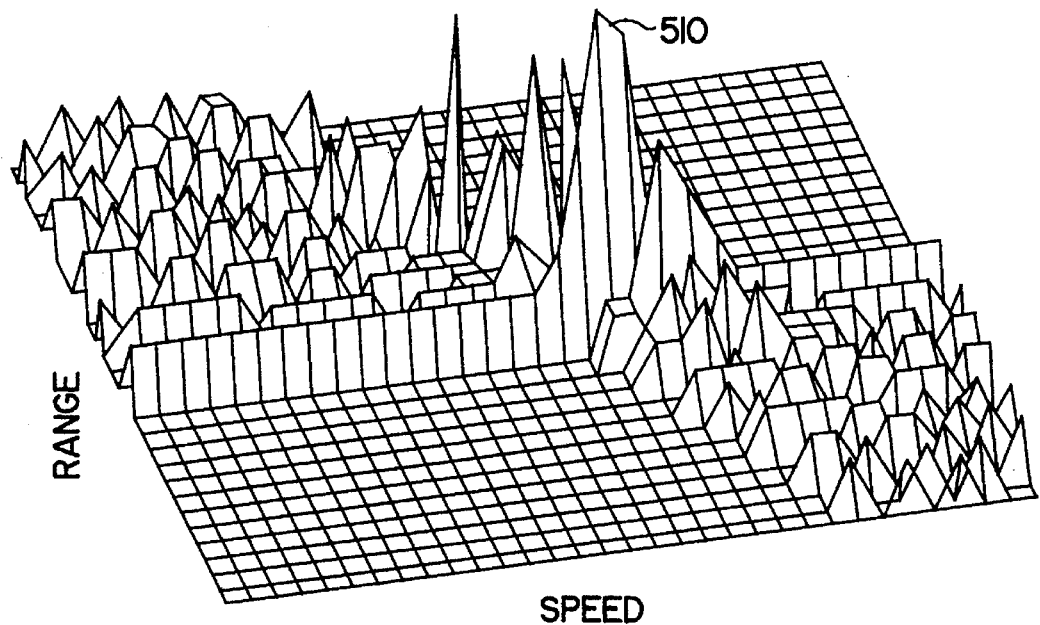
FIG. 27 illustrates a 2-D range-speed histogram.

The 2-D parameter estimation device 504 transforms the 2-D target space array into the 2-D estimation signal which includes range and speed data using a Hough transform to generate histograms. Hough transforms are described in U.S. Pat. No. 3,069,654 to Paul V. Hough, entitled "A Method and Means for Recognizing Complex Patterns", hereby incorporated by reference The range and speed data generated by the Hough transform are quantized into a 2-D range-speed (FIG. 27) histogram. The size of the bins of the range-speed histogram is related to the size of the discrete range bins generated by the spectrum estimation device 414, the time interval between successive range profiles, and the duration of the moving time window. As the range and speed data generated by the Hough transform is collected in the bins of the 2-D range-speed histogram, peaks are formed in the range-speed bins which identify a target range and speed at 510 in FIG. 27. If the target is moving along a constant velocity curve, the peaks can be easily identified. If the target is not moving along the constant velocity curve or if spurious data points or clutter are present, the target speed and range can still be identified, as described further below.

The Hough transform method generates the target range and target speed data by computations using straight line tracks (constant velocity) and/or curved tracks (acceleration). Range profiles for a range bin should remain above the corresponding range bin in the threshold range profile signal for a majority of the duration of the Hough transform to be considered as authentic targets. Requiring range profiles to remain above the threshold range profile signal provides further discrimination of spurious data, clutter and noise signals which can trigger false alarms. The target speed can be determined from the calculated tracks.

For purposes of simplicity, application of the Hough transform to non-accelerating targets is described below. The 2-D target space array is analyzed by the parameter estimation device 500 or the controller 386 using the Hough transform to detect straight line tracks. An ideal non-accelerating point target has a 2-D target space array including target flags which form a straight line over time, for example, see FIG. 25. However, complex targets like automobiles are larger than ideal point targets and radar transmit signals can be reflected by several different portions of the automobile. Hough transforms can accommodate these complex targets.

The Hough transform maps points in 2-D x (range) and y (time) space to lines in 2-D slope and intercept space. Each point in the x–y space generates a line in slope-intercept space. Speed or range rate can be derived from the slope value and range can be derived from the intercept value. The 2-D range-speed histogram is composed of a plurality of quantized bins which accumulate or count occurrences of samples having a value within each quantized bin. The count thus accumulated is hereinafter referred to as a "vote" for a quantized bin. The 2-D range-speed histogram including the plurality of quantized bins containing votes approximates a probability density function for speed and range from many points in the x–y space using the Hough transform.

The tracking mode uses 3-D parameter estimation to allow for accelerating/decelerating targets and is performed in a reduced 3-D Hough space to focus on the target(s) of interest. The acquisition mode uses 2-D parameter estimation over a larger 2-D Hough space which includes all reasonable speeds and positions.

TARGET DECISION DEVICE—3-D PARAMETER ESTIMATION

In the tracking mode, the RSP 380 triggers a 3-D parameter estimation device 530 which performs computations on the target space array to estimate distance, speed and acceleration of the target. A Hough transform transforms the target space array (range, time) into 3-D Hough space (range, velocity, and acceleration) illustrated in FIGS. 28A–28D.

The 3-D parameter estimation device 530 utilizes range gating by defining intervals (or generating a tracking threshold signal) around current values of range, speed, and acceleration to create a tracking cube in 3-D Hough space which moves with the target as the target is tracked. In other words, after estimating target speed, range, and acceleration for one interval, the range and speed of the target at a subsequent sample can be estimated assuming relatively constant acceleration. The 3-D tracking cube for the subsequent sample is centered on the estimated range and speed for the subsequent sample. The 3-D parameter estimation device 530 uses a 3-D histogram (range, speed, acceleration) to identify current range, speed and acceleration.

Figure 28A:
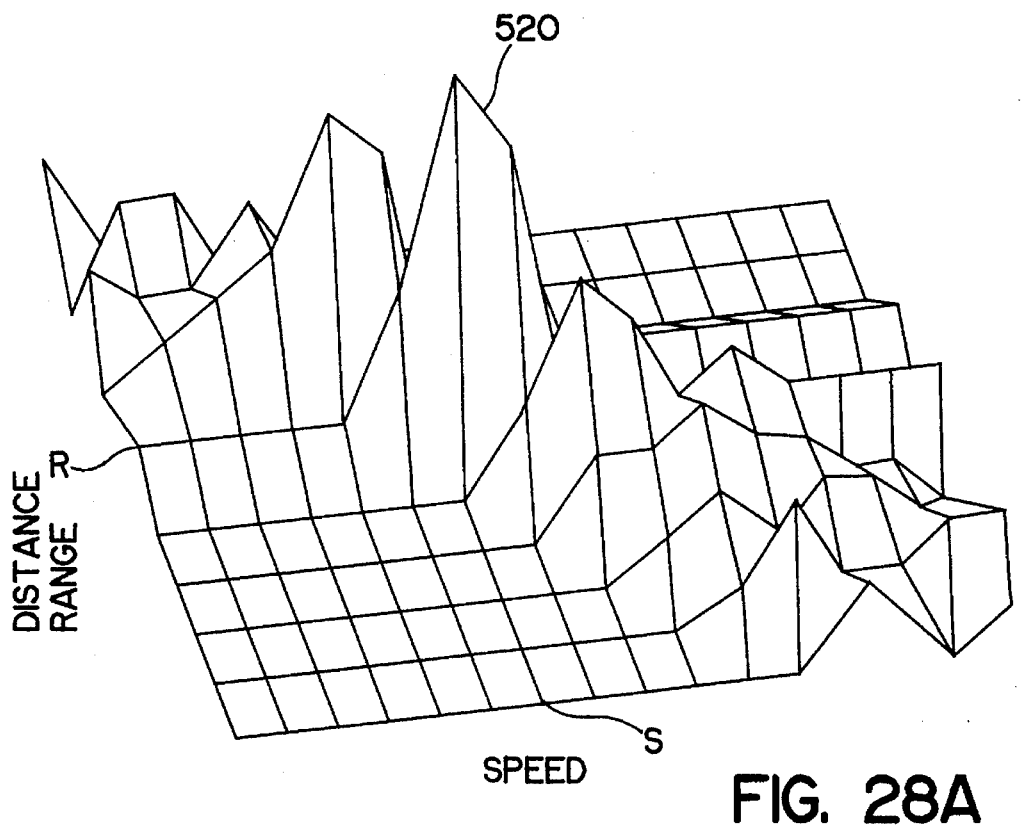
FIGS. 28A–28D illustrate a 3-D range-speed-acceleration histogram generated by a 3-D parameter estimation device of FIG. 15.
Figure 28B:
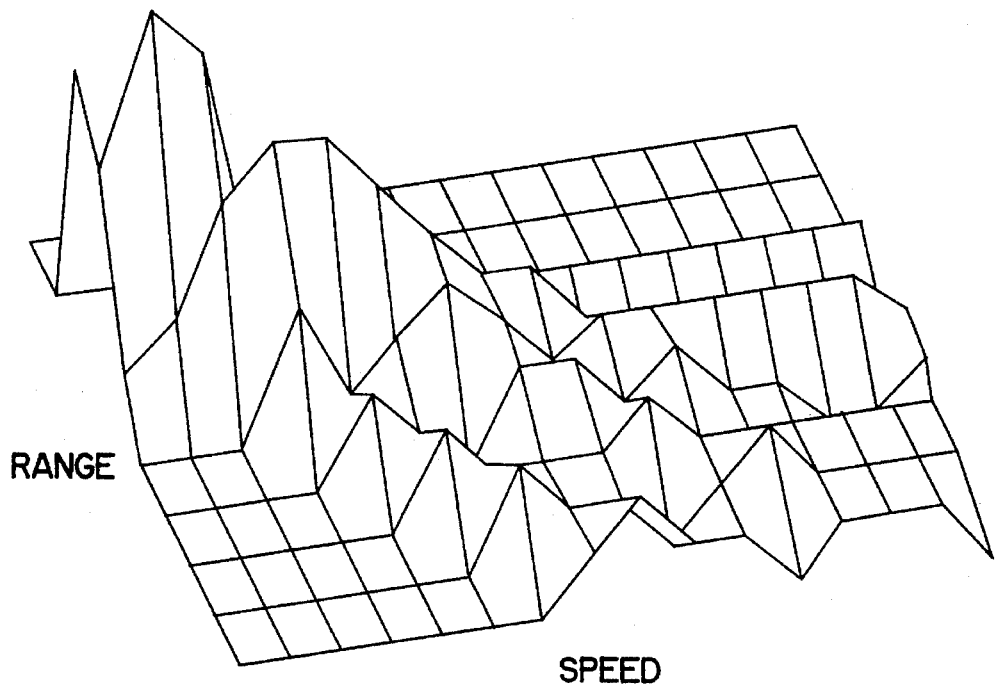
Figure 28C:
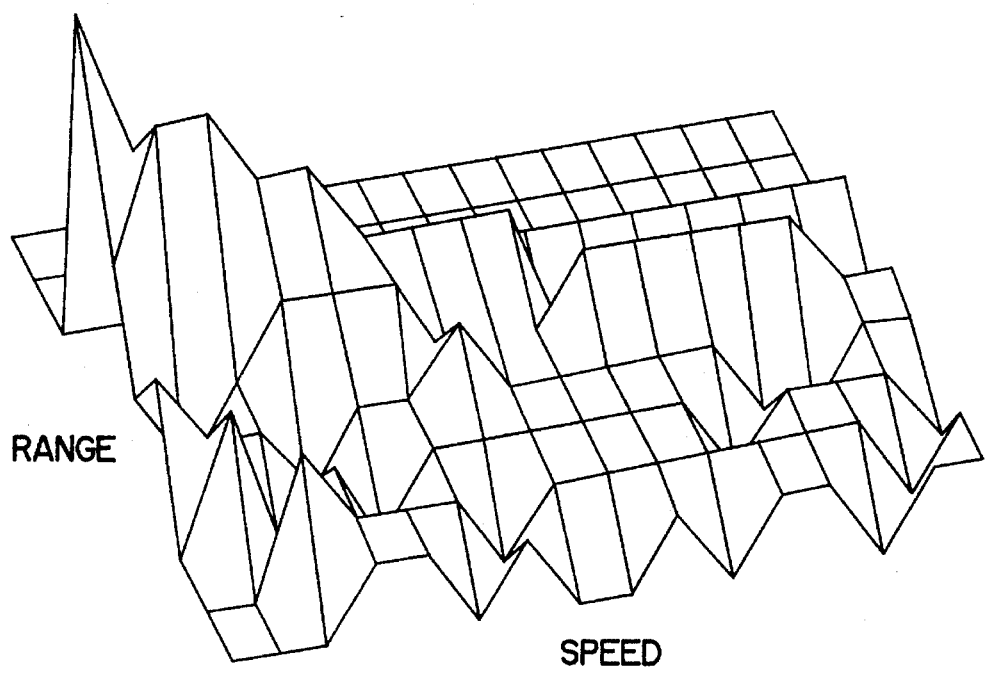
Figure 28D:
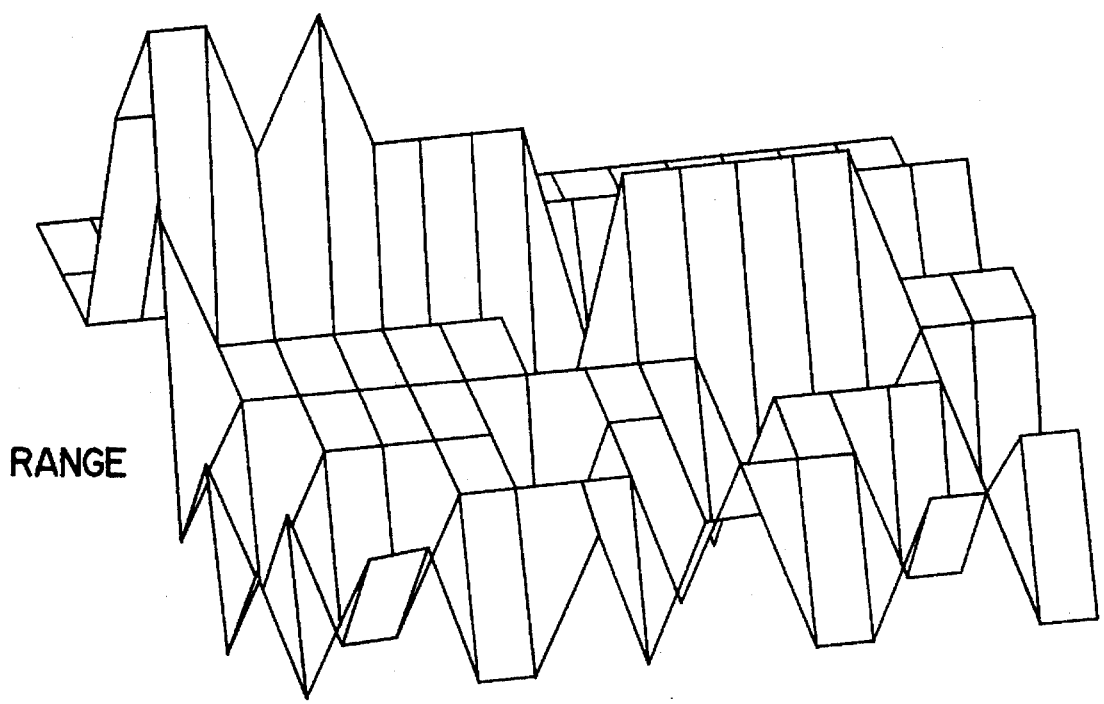

FIGS. 28A–28D illustrate an example 3-D histogram. FIG. 28A illustrates range and speed bins for a first acceleration value. FIG. 28B illustrates range and speed bins for a second acceleration value. FIG. 28C illustrates range and speed bins for a third acceleration value. FIG. 28D illustrates range and speed bins for a fourth acceleration value. Using the 3-D histogram, range, speed and acceleration for a target can be determined. In the example given in FIGS. 28A–28D, peak 520 in FIG. 28A identifies the most likely speed S, range R, and the first acceleration value for the target. Other acceleration values in FIGS. 28B–28D have lower peaks and, therefore, represent less likely solutions of range, speed and acceleration.

If, for example, a tracking threshold set at 5 votes in one histogram bin and a tracking signal representing the highest current probability density (in the 3-D tracking cube) for a particular value of range, speed and acceleration is 7 votes, a tracking counter is incremented 2 votes. If the tracking signal is 4 votes, the tracking counter would be decremented 1 vote. As such, the 3-D parameter estimation device provides hysteresis. If measured values for range, speed, or acceleration are outside of the 3-D tracking cube, the measured values are considered spurious and are ignored. Every time interval that a valid track is determined (by the 3-D histogram in Hough space), a counter is incremented until a maximum value is reached. As long as the target is still evident through threshold detection and Hough transform tracking, the counter remains at its maximum value. When the target is missed for a time interval, the counter is decreased. If the target is reacquired when the counter value is still positive, it is again incremented, as before. If the counter goes to zero because a significant number of misses occur in close enough proximity, then the target is assumed lost, and the acquisition mode is initiated.

The acceleration parameter is required in the tracking mode because vehicles being tracked do not typically move at a constant velocity. If a vehicle was tracked using 2-D Hough space (range, speed—also called the 2-D estimation signal) only and the vehicle braked, the target would be smeared in the 2-D target space due to the deceleration (negative acceleration) and detection using histograms would be very difficult. Without the acceleration parameter, the RSP 380 would lose the target.

As described above, the target decision device 500 or the controller 386 connected to the 2-D parameter estimation device 504 evaluates the 2-D estimation signal and determines whether a valid target exists. If the target decision device 500 or controller 386 determines that a valid target exists, the acquisition mode is ended and the tracking mode is initiated. If multiple valid targets are identified during the acquisition mode, the closest target (e.g. having the shortest range) is normally selected for the tracking mode and the target decision device 500 switches to the tracking mode.

As described above, target decision device 500 or controller 386 includes the tracking counter which is initialized when the tracking mode is initiated. The tracking counter monitors the current status of the target being tracked. The 3-D parameter estimation device 530 generates and outputs the tracking signal representing probability density of a current target in the 3-D tracking cube to the target decision device 500 or controller 386 which compares the tracking signal to the tracking threshold signal at each tracking time interval. As described above, the tracking counter is incremented at each tracking time interval if the tracking signal exceeds the tracking threshold signal. The tracking counter is decremented at each tracking time interval if the tracking signal is below the tracking threshold.

As long as the tracking counter is above zero, the target decision device 500 or controller 386 continues the tracking mode. If the tracking counter falls to zero, then the target is presumed to be lost and the target decision device 500 or controller 386 returns to the acquisition mode. The target counter provides hysteresis to prevent the target decision device 500 from switching to the acquisition mode when the target is momentarily lost.

To reduce delay in reporting the target range and speed, the target decision device 500 or controller 386 generates an estimated range signal and an estimated speed signal of the target from past measured values of target range and target speed. If the target decision device 500 generates the estimated range and speed signals, the target decision device 500 outputs the estimated range and speed signals to the controller 386.

Hysteresis in the tracking mode is adaptive since it is a function of the length of time a target has been tracked and a function of the tracking signal which is related to the confidence that an actual target is being tracked. The tracking counter is not used in the acquisition mode so that targets may be initially identified.

Past estimations of range and velocity are compared with current estimates of range and velocity to increase discrimination of targets from environmental clutter and noise, to eliminate strong reflected returns from stationary objects, and to prevent false alarms.

Power gating involves interrupting transmit power to the radar system's antenna when computations are being performed on radar samples. Power gating can be performed by controller 386, DSPC 18, or another circuit. Power gating reduces average transmit power, reduces mutual interference between radar units operating in relatively close proximity, and reduces cumulative radiation exposure in the environment.

The RSP 380 employs beam angle tracking or dithering by varying azimuth and elevation angles of the tracking beam. Returns from an object being tracked are compared to locate a maximum (e.g. peaks in Hough space) and error signals are generated for servo control of azimuth and elevation angles of the tracking beam. Beam angle tracking in combination with 3-D tracking (range, velocity, acceleration) provides increased noise and clutter rejection and allows tracking of one target with less false data generation. As a result, the RSP 380 provides improved target tracking.

RSP 380 can also use vehicle steering signals generated by vehicle steering sensor 396 to maintain target tracking around corners, to discriminate a target being tracked from clutter such as guard rails, fences, trees, etc., and to confirm azimuth angle estimates generated using beam angle tracking.

While data sampling device 404, energy estimation device 410, gain control device 408, spectrum estimation device 414, time domain window device 418, FFT device 428, magnitude determining device 432, noise equalization device 444, averaging or integration device 456, adaptive threshold device 464 (including devices 470, 472, 473, 474, 478 and 484), 2-D parameter estimation device 504, target decision device 500, 3-D parameter estimation device 530, and controlled device 394 are described as "devices", they can be implemented in firmware, software and/or hardware.

The controller 386 for the RSP 380 can be implemented using the DSPC 16 (with additional connections shown in FIG. 15 added to the DSPC 18 of FIG. 1) or using a separate microprocessor. Other configurations are readily apparent. Additionally, interconnections between the controller 386 and memory 388 and devices in the spectrum estimation device 414, the adaptive threshold device 464, etc. are omitted for the purpose of clarity. The spectrum estimation device 414, the adaptive threshold device 464, etc. can each include a controller and memory if desired.

As can be appreciated, the controller 386 can use the estimated range and estimated speed signals to control the controlled device 394. For example, the estimated range and estimated speed signals can be used in an active cruise control system. When the speed (set in the active cruise control) of a controlled vehicle is greater than the estimated speed of a target vehicle and the range is less than a preset range (for example, two car lengths), the active cruise control can momentarily decrease the set speed until the range is greater than the present range, the target vehicle is lost, or the target vehicle moves out of the controlled vehicle's lane. The active cruise control can then resume the set speed.

The RSP 380 provides target range and speed predictions based on prior range and speed values to reduce target reporting time which is essential in collision avoidance and warning scenarios. An estimate of the present speed and range can be made by a linear combination of predicted values based on previous measurements and the present measurements. This method tends to damp out temporal fluctuations.

The RSP 380 can effectively operate with noisy signals, high clutter environments, and scintillating (i.e. time varying velocity and acceleration) targets using spectrum estimation, adaptive threshold and parameter estimation techniques. Further, while tracking a target vehicle, other vehicles can be ignored.

Calculations performed by the RSP 380 can be done using fixed-point arithmetic to allow relatively low-cost processors to be used. Quantization of spectra and parameter estimation allows sufficient accuracy while reducing processor time. Division operations are minimized to further reduce processing time.

The various advantages of the present invention will become apparent to those skilled in the art after a study of the foregoing specification and following claims.

In view of the foregoing, it can be appreciated that the present invention enables the user to achieve an effective, compact, flexible and integrated radar system. Thus, while this invention has been described in connection with a particular example thereof, no limitation is intended thereby except as defined by the following claims. This is because the skilled practitioner will realize that other modifications can be made without departing from the spirit of this invention after studying the specification and drawings.

What is claimed is:

1. In a radar system including a radar transceiver means for generating transmit signals and for receiving signals reflected by targets, and a mixer for combining the transmit signals and the reflected signals into a mixer signal, a radar signal processor comprising:

sampling means, connected to said mixer, for sampling the mixer signal and for generating a sampled mixer signal;

spectrum estimation means, connected to said sampling means, for generating a plurality of range profile signals each including a plurality of range bins containing a magnitude of a spectral component;

threshold means, connected to said spectrum estimation means, for generating a target profile signal for each of said plurality of range profile signals and for updating a target space array including a stack of target profile signals by adding a new target profile signal to said stack and by discarding an old target profile signal from said stack; and target decision means, connected to said threshold means, for generating estimated range and speed signals for a closest target from said target space array.

2. The radar signal processor of claim 1 wherein said spectrum estimation means includes time window means, connected to said sampling means, for generating a windowed signal by multiplying said sampled mixer signal with a time window function to reduce spectral leakage.

3. The radar signal processor of claim 2 wherein said spectrum estimation means further includes generating means, connected to said time window means, for generating a frequency spectrum signal including a series of spectral components.

4. The radar signal processor of claim 3 wherein said generating means uses a fast fourier transform to generate said frequency spectrum signal.

5. The radar signal processor of claim 3 wherein said spectrum estimation means further includes magnitude means, connected to said generating means, for generating a magnitude range profile signal including a plurality of range bins each containing magnitudes of said spectral components.

6. In a radar system including a radar transceiver means for generating transmit signals and for receiving signals reflected by targets, and a mixer for combining the transmit signals and the reflected signals into a mixer signal, a radar signal processor comprising:

sampling means, connected to said mixer, for sampling the mixer signal and for generating a sampled mixer signal;

a spectrum estimator including
time window means, connected to said sampling means, for generating windowed signals by multiplying said sampled mixer signal with a time window function to reduce spectral leakage,
generating means, connected to said time window means, for generating frequency spectrum signals each including a series of spectral components,
magnitude means, connected to said generating means, for generating magnitude range profile signals each including a plurality of range bins containing magnitudes of said spectral components, and
equalization means, connected to said magnitude means, for generating equalized range profile signals each including a plurality of range bins having a noise floor substantially constant with respect to frequency;

threshold means, connected to said spectrum estimator for generating a target space array from said equalized range profile signals; and target decision means, connected to said threshold means, for generating estimated range and speed signals for a closest target from said target space array.

7. In a radar system including a radar transceiver means for generating transmit signals and for receiving signals reflected by targets, and a mixer for combining the transmit signals and the reflected signals into a mixer signal, a radar signal processor comprising:

sampling means, connected to said mixer, for sampling the mixer signal and for generating a sampled mixer signal;

a spectrum estimator including time window means, connected to said sampling means, for generating windowed signals by multiplying said sampled mixer signal with a time window function to reduce spectral leakage, generating means, connected to said time window means, for generating frequency spectrum signals each including a series of spectral components, magnitude means, connected to said generating means, for generating magnitude range profile signals each including a plurality of range bins containing magnitudes of said spectral components, equalization means, connected to said magnitude means, for generating equalized range profile signals each including a plurality of range bins having a noise floor substantially constant with respect to frequency, and averaging means, connected to said equalization means, for integrating a current equalized range profile signal with at least one prior range profile signal to generate an integrated range profile signal and to increase signal to noise ratio thereof;

threshold means, connected to said spectrum estimator for generating a target space array from a plurality of said integrated range profile signals; and target decision means, connected to said threshold means, for generating estimated range and speed signals for a closest target from said target space array.

8. The radar signal processor of claim 1 wherein said threshold means generates a threshold range profile signal including a plurality of range bins and includes a comparing means for comparing said range bins of said threshold range profile signal with range bins of said range profile signal, wherein said threshold means generates target flags for range bins of said range profile signal having a magnitude above a corresponding range bin of said threshold range profile signal.

9. The radar signal processor of claim 8 wherein the magnitude of said range bins of said threshold range profile signal are related to the magnitude of a plurality of adjacent range bins of said range profile signal.

10. In a radar system including a radar transceiver means for generating transmit signals and for receiving signals reflected by targets, and a mixer for combining the transmit signals and the reflected signals into a mixer signal, a radar signal processor comprising:

sampling means, connected to said mixer, for sampling the mixer signal and for generating a sampled mixer signal;

spectrum estimation means, connected to said sampling means, for generating a plurality of range profile signals each including a plurality of range bins containing a magnitude of a spectral component; threshold means, connected to said spectrum estimation means, for generating a target space array from said range profile signals, said threshold means including averaging means including a moving window for generating an average magnitude by averaging the magnitudes of a plurality of adjacent range bins in said range profile signal, multiplying means for multiplying said average magnitude by a threshold constant to generate a detection threshold value for one range bin in said threshold range profile signal, incrementing means for incrementing said moving window, and control means for repeatedly actuating said averaging means, said multiplying means, and said incrementing means to generate detection threshold values for each range bin of said threshold range profile signal; and target decision means, connected to said threshold means, for generating estimated range and speed signals for a closest target from said target space array.

11. The radar signal processor of claim 10 wherein said threshold means further includes centroiding means for combining target flags in adjacent range bins and for generating a single target centroid flag in a range bin central to said adjacent range bins.

12. In a radar system including a radar transceiver means for generating transmit signals and for receiving signals reflected by targets, and a mixer for combining the transmit signals and the reflected signals into a mixer signal, a radar signal processor comprising:

sampling means, connected to said mixer, for sampling the mixer signal and for generating a sampled mixer signal;

spectrum estimation means, connected to said sampling means, for generating a plurality of range profile signals each including a plurality of range bins containing a magnitude of a spectral component;

threshold means, connected to said spectrum estimation means, for generating a target space array from said range profile signals; and target decision means, connected to said threshold means, for generating estimated range and speed signals for a closest target from said target space array, said target decision means including first estimation means for executing an acquisition mode by performing a Hough transform to derive target range and speed for at least one target using said target space array.

13. The radar signal processor of claim 12 wherein said first estimation means further includes histogram means for identifying estimated target range and speed for said at least one target for a said target space array, and wherein said target decision device terminates said acquisition mode and initiates a tracking mode if said estimated target speed correlates to a substantially constant velocity during an acquisition interval.

14. The radar signal processor of claim 13 wherein said target decision means includes second estimation means for executing said tracking mode by performing a Hough transform to derive target range, speed and acceleration for at least one target using said target space array.

15. The radar signal processor of claim 14 wherein said second estimation means further includes histogram means for identifying estimated target range, speed, and acceleration for said at least one target over a plurality of target space arrays.

16. The radar signal processor of claim 15 wherein said second estimation means outputs a tracking signal related to relative probability that said target has said estimated target range, speed, and acceleration to said target decision means.

17. The radar signal processor of claim 16 wherein said target decision means includes hysteresis means for evaluating said tracking signal and for providing hysteresis in a determination to continue said tracking mode or initiate said acquisition mode.

18. The radar signal processor of claim 17 wherein said hysteresis means includes a tracking counter and a comparing means for comparing said tracking signal to a tracking threshold.

19. The radar signal processor of claim 18 wherein said hysteresis means increments said counter when said tracking signal exceeds said tracking threshold, decrements said counter when said tracking signal is less than said tracking threshold, and ends said tracking mode when said tracking counter decreases to zero after being incremented.

20. The radar signal processor of claim 1 wherein said estimated target range and speed signals are utilized to operate a controlled device.

21. In a radar system including a radar transceiver means for generating transmit signals and for receiving signals reflected by targets, and a mixer for combining the transmit signals and the reflected signals into a mixer signal, a radar signal processor comprising:

sampling means, connected to said mixer, for sampling the mixer signal and for generating a sampled mixer signal;

spectrum estimation means, connected to said sampling means, for generating a plurality of range profile signals each including a plurality of range bins containing a magnitude of a spectral component;

threshold means, connected to said spectrum estimation means, for generating a target space array from said range profile signal; and target decision means, connected to said threshold means, for generating estimated range and speed signals for a closest target from said target space array, said target decision means utilizing a prior estimated target range and speed to generate an approximated target range and speed for a subsequent sample period and compares the approximated target range and speed with an estimated range and speed for the subsequent sample period to reduce clutter and noise.

22. In a radar system including a radar transceiver means for generating transmit signals and for receiving signals reflected by targets, and a mixer for combining the transmit signals and the reflected signals into a mixer signal, a radar signal processor comprising:

sampling means, connected to said mixer, for sampling the mixer signal and for generating a sampled mixer signal;

spectrum estimation means, connected to said sampling means, for generating a plurality of range profile signals each including a plurality of range bins containing a magnitude of a spectral component;

threshold means, connected to said spectrum estimation means, for generating a target space array from said range profile signal;

target decision means, connected to said threshold means, for generating estimated range and speed signals for a closest target from said target space array; and gating means for momentarily interrupting power to an antenna connected to said radar transceiver while said radar signal processor computes said estimated target range and speed to reduce environment interference, environmental exposure to radiation, and average transmit power.

23. The radar signal processor of claim 19 further comprising:

beam angle tracking means for tracking said target in azimuth and elevation directions by varying azimuth and elevation angles of said tracking beam to maximize target reflected signals.

24. The radar signal processor of claim 23 further comprising:

sensor means for generating a vehicle steering signal related to changes in vehicle steering direction, wherein said vehicle steering signal is input to said target decision means and said beam angle tracking means to decrease false data generation, clutter and noise.

\* \* \* \* \*